United States Patent
Kim et al.

(10) Patent No.: US 9,743,353 B2
(45) Date of Patent: *Aug. 22, 2017

(54) METHOD AND DEVICE FOR ACCESSING CHANNEL IN WIRELESS LAN SYSTEM

(71) Applicant: LG Electronics Inc., Seoul (KR)

(72) Inventors: Jeongki Kim, Anyang-si (KR); Yongho Seok, Anyang-si (KR); Jinsam Kwak, Anyang-si (KR); Jinsoo Choi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/264,125

(22) Filed: Sep. 13, 2016

(65) Prior Publication Data

US 2016/0381635 A1 Dec. 29, 2016

Related U.S. Application Data

(63) Continuation of application No. 14/398,016, filed as application No. PCT/KR2013/003747 on Apr. 30, 2013, now Pat. No. 9,485,731.

(60) Provisional application No. 61/640,664, filed on Apr. 30, 2012.

(51) Int. Cl.
*H04L 12/28* (2006.01)
*H04W 52/02* (2009.01)
*H04W 74/08* (2009.01)
*H04W 74/04* (2009.01)
*H04W 84/12* (2009.01)

(52) U.S. Cl.
CPC ... *H04W 52/0225* (2013.01); *H04W 52/0216* (2013.01); *H04W 74/04* (2013.01); *H04W 74/08* (2013.01); *H04W 84/12* (2013.01); *Y02B 60/50* (2013.01)

(58) Field of Classification Search
CPC ..................................................... H04W 74/04
USPC ................................................... 370/255–390
See application file for complete search history.

(56) References Cited

U.S. PATENT DOCUMENTS

2005/0135302 A1 6/2005 Wang et al.
2005/0136833 A1 6/2005 Emeott et al.
2005/0152324 A1 7/2005 Benveniste
(Continued)

FOREIGN PATENT DOCUMENTS

JP 2007053483 A 3/2007
KR 10-2011-0058712 A 6/2011
(Continued)

OTHER PUBLICATIONS

Sayantan Choudhury, Nokia: "Uplink Data Indication in NDP PS-Poll", IEEE 802.11-1211308r0, Nov. 8, 2012.
(Continued)

*Primary Examiner* — Iqbal Zaidi
(74) *Attorney, Agent, or Firm* — Dentons US LLP

(57) ABSTRACT

According to one embodiment of the present invention, a method for performing a channel access by a station (STA) in a wireless communication system comprises the steps of: transmitting a first frame for a channel access request to an access point (AP); and receiving a second frame, which is a response to the channel access request, from the AP, wherein the first frame includes information indicating whether or not uplink data of the STA is present.

8 Claims, 24 Drawing Sheets

(56) References Cited

U.S. PATENT DOCUMENTS

| | | | |
|---|---|---|---|
| 2007/0104201 A1 | 5/2007 | Wentink et al. | |
| 2007/0281617 A1 | 12/2007 | Meylan et al. | |
| 2012/0257521 A1* | 10/2012 | Mehta | H04W 72/1215 370/252 |
| 2013/0051293 A1 | 2/2013 | Wentink et al. | |
| 2013/0176925 A1 | 7/2013 | Sampath et al. | |

FOREIGN PATENT DOCUMENTS

| | | |
|---|---|---|
| KR | 10-2011-0119555 A | 11/2011 |
| WO | 2010-027226 A2 | 3/2010 |
| WO | 2011-149271 A2 | 12/2011 |
| WO | 2011-149285 A2 | 12/2011 |

OTHER PUBLICATIONS

Klaus Doppler, Nokia: "Ps-Poll Immediate ACK Enhancements", IEEE 802.11-12/0327r0, Mar. 12, 2012.

\* cited by examiner

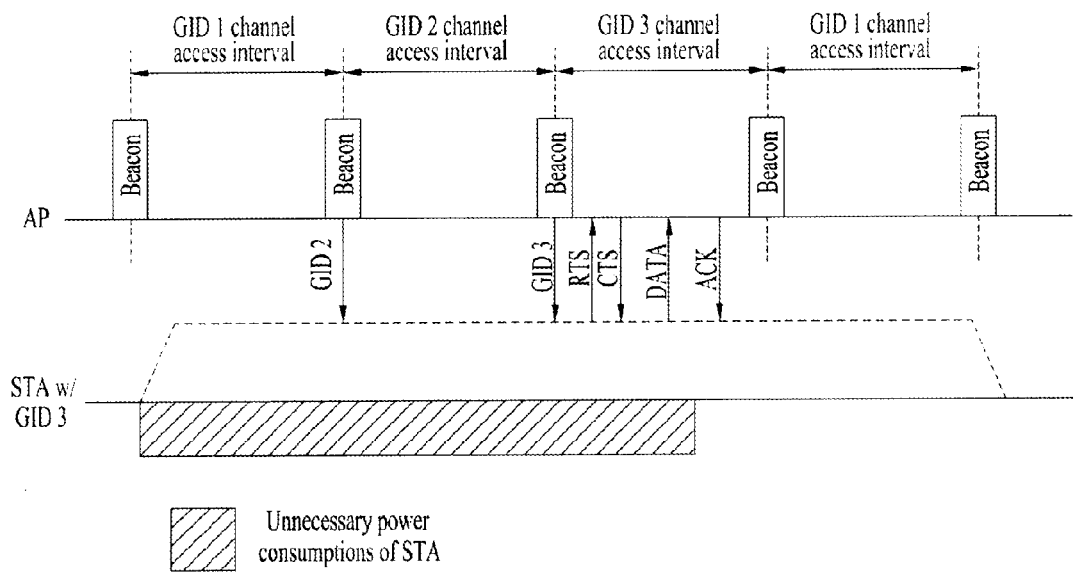

| Frame Control | AID | BSSID | Time stamp | FCS |
|---|---|---|---|---|

Otect: 2　2　6　L　2

(b)

| Frame Control | AID | BSSID | ACK | FCS |
|---|---|---|---|---|

Otect: 2　2　6　L　2

(c)

| Frame Control | AID | BSSID | Channel Access start offset | Granted Channel Access Duration | FCS |
|---|---|---|---|---|---|

Otect: 2　2　6　L1　L2　2

(d)

| Frame Control | AID | BSSID | Current Access Group Number | Next Access Group Start Offset | FCS |
|---|---|---|---|---|---|

Otect: 2　2　6　L1　L2　2

| Frame Control | AID | BSSID | Response information | FCS |
|---|---|---|---|---|

Otect: 2　2　6　2

(b)

| Response type | Body |
|---|---|

Bits: 3　L (e.g., 5 or 13)

FIG. 20

(a)
| Response Type = 000 | Channel Access Duration |

(b)
| Response Type = 000 | Channel Access Duration | Time Stamp |

(c)
| Response Type = 001 | Current Channel Access Group ID (CCAGID) | Next Access Group start offset (NAGSO) |

(d)
| Response Type = 001 | Current Channel Access Group ID (CCAGID) | Next Access Group Start Offset | Time Stamp | Granted Channel Access Duration (GCAD) |

(e)
| Response Type = 010 | New Group ID (or new AID) |

FIG. 21

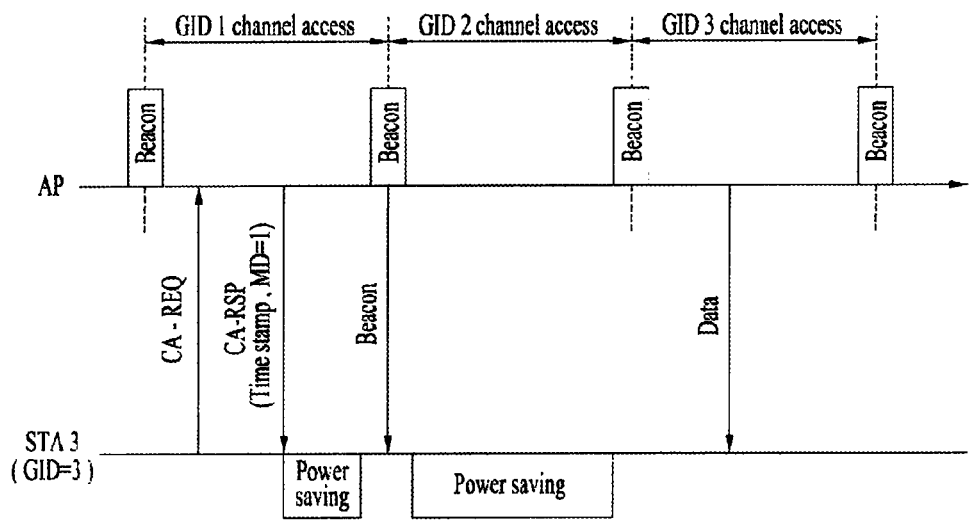

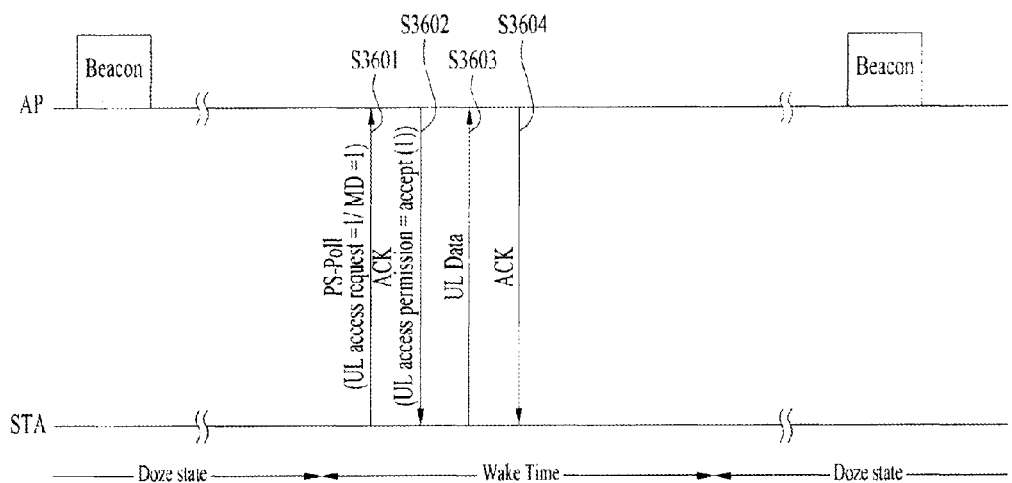
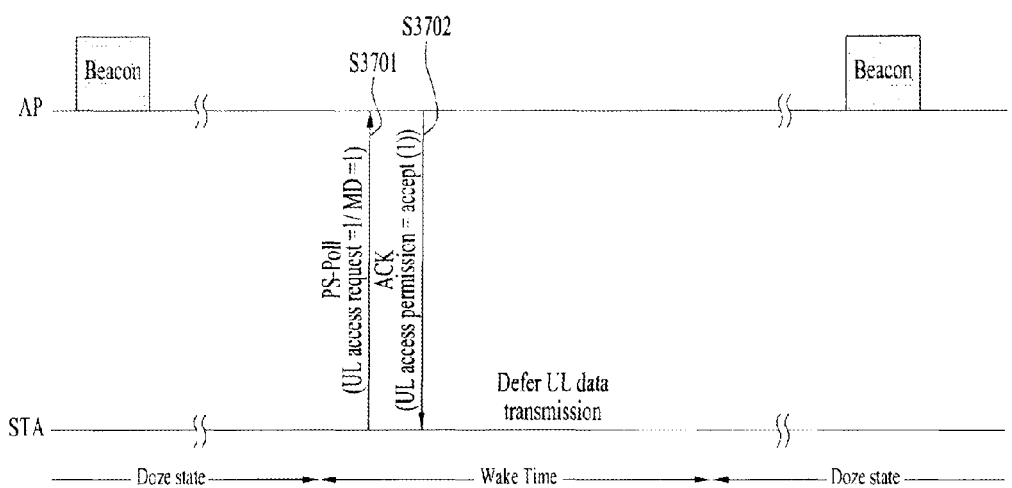

METHOD AND DEVICE FOR ACCESSING CHANNEL IN WIRELESS LAN SYSTEM

This application is a continuation of U.S. application Ser. No. 14/398,016, filed on Oct. 30, 2014, now allowed, which is a 371 national stage entry of International Application No. PCT/KR2013/003747, filed Apr. 30, 2013, and claims the benefit of U.S. Provisional Application No. 61/640,664, filed on Apr. 30, 2012, all of which are incorporated by reference in their entirety herein.

TECHNICAL FIELD

The present invention relates to a wireless communication system, and more particularly, to a method and apparatus for accessing a channel in a Wireless Local Area Network (WLAN) system.

BACKGROUND ART

Along with the recent development of information and communication technology, various wireless communication technologies are under development. Among them, WLAN is a technology that enables wireless access to the Internet through a portable terminal such as a Personal Digital Assistant (PDA), a laptop computer, a Portable Multimedia Player (PMP), etc. in a home, an office, or a specific service area by radio frequency technology.

To overcome the limitations of WLAN in communication speed, the recent technology standards have introduced a system that increases network speed and reliability and extends the coverage of a wireless network. For example, Institute of Electrical and Electronics Engineers (IEEE) 802.11n adopts Multiple Input Multiple Output (MIMO) using multiple antennas at both a transmitter and a receiver in order to support High Throughput (HT) with a data processing rate of up to 540 Mbps, minimize transmission errors, and optimize a data rate.

DISCLOSURE

Technical Problem

Machine-to-Machine (M2M) communication is under discussion as a future-generation communication technology. IEEE 802.11 WLAN is also developing a technology standard for M2M communication as IEEE 802.11ah. For M2M communication, a scenario in which a small amount of data is transmitted at a low rate intermittently in an environment with a large number of devices may be considered.

Communication is conducted through a medium shared among all devices in a WLAN system. If the number of devices is increased as in M2M communication, a channel access mechanism needs to be improved more efficiently in order to reduce unnecessary power consumption and interference.

An object of the present invention devised to solve the conventional problem is to provide an improved method and apparatus for accessing a channel in a Wireless Local Area Network (WLAN) system.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for performing channel access by a Station (STA) in a wireless communication system includes transmitting a first frame related to a channel access request to an Access Point (AP), and receiving a second frame from the AP in response to the channel access request. The first frame includes information indicating the presence or absence of uplink data in the STA.

In another aspect of the present invention, an STA for performing channel access in a wireless communication system includes a transceiver configured to transmit and receive wireless signals, and a processor. The processor is configured to transmit a first frame related to a channel access request to an AP and to receive a second frame from the AP in response to the channel access request, and the first frame includes information indicating the presence or absence of uplink data in the STA.

In another aspect of the present invention, a method for supporting channel access of an STA by an AP in a wireless communication system includes receiving a first frame related to a channel access request from the STA, and transmitting a second frame to the STA in response to the channel access request. The first frame includes information indicating the presence or absence of uplink data in the STA.

In another aspect of the present invention, an AP for supporting channel access of an STA in a wireless communication system includes a transceiver configured to transmit and receive wireless signals, and a processor. The processor is configured to receive a first frame related to a channel access request from the STA, and to transmit a second frame to the STA in response to the channel access request, and the first frame includes information indicating the presence or absence of uplink data in the STA.

The above aspects of the present invention may include the followings.

The first frame may be a Null Data Packet (NDP) Power Save (PS)-Poll frame.

Or the first frame may be a PS-Poll frame.

The information indicating the presence or absence of uplink data in the STA may be included in a More Data (MD) field of the PS-Poll frame.

If the information indicating the presence or absence of uplink data in the STA indicates the presence of uplink data, the second frame may include information indicating whether transmission of the uplink data is accepted.

If the information indicating whether transmission of the uplink data is accepted accepts transmission of the uplink data, the STA may transmit the uplink data after a Short Inter-Frame Space (SIFS).

If the information indicating whether transmission of the uplink data is accepted does not accept transmission of the uplink data, the STA may receive a beacon frame for transmission of the uplink data.

If the information indicating whether transmission of the uplink data is accepted does not accept transmission of the uplink data, the second frame may include start offset information and duration information.

The STA may transmit the uplink data after a time indicated by the start offset information.

After receiving the second frame, the STA may be maintained in a doze state for a time period indicated by the start offset information and is maintained in an awake state for a time period indicated by the duration information.

The STA may receive downlink data in a time period indicated by the duration information.

If the STA activates a timer after transmitting the uplink data, the STA may switch to a doze state even before a time period indicated by the duration information elapses, upon expiration of the timer.

Advantageous Effects

According to the present invention, an improved method and apparatus for accessing a channel can be provided in a Wireless Local Area Network (WLAN) system. Further, a method and apparatus for accessing a channel can be provided according to the present invention, which reduces power consumption of a device and interference experienced by the device.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIGS. 14, 15, and 16 illustrate exemplary operations of an STA, when group channel access intervals are set;

FIG. 17 illustrates exemplary formats of a Channel Access Request (CA-REQ) frame according to the present invention;

FIGS. 18, 19, and 20 illustrates exemplary formats of a Channel Access Response (CA-RSP) frame according to the present invention;

FIGS. 21 to 34 illustrate exemplary improved channel access operations using a first frame and a second frame according to the present invention;

FIGS. 36 to 44 illustrate exemplary channel access operations for Uplink (UL) data transmission according to the present invention.

BEST MODE FOR CARRYING OUT THE INVENTION

Figure 1:
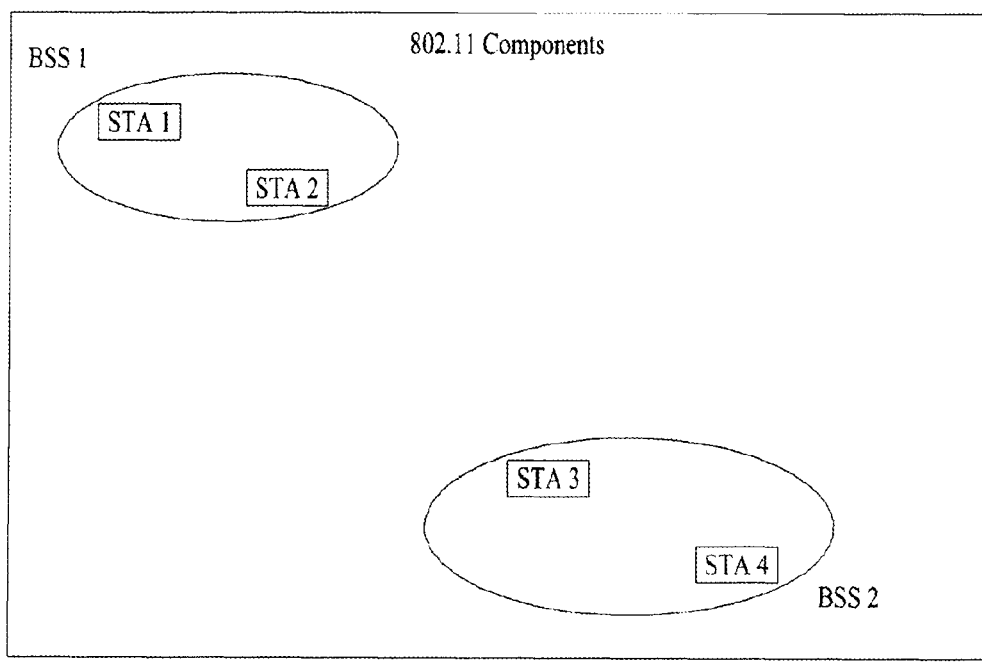
FIG. 1 illustrates an exemplary configuration of an Institute of Electrical and Electronics Engineers (IEEE) 802.11 system to which the present invention is applicable.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

Specific terms used for the embodiments of the present invention are provided to help the understanding of the present invention. These specific terms may be replaced with other terms within the scope and spirit of the present invention.

In some instances, known structures and devices are omitted or are shown in block diagram form, focusing on important features of the structures and devices, so as not to obscure the concept of the invention Like reference numerals denote the same components throughout the specification.

The embodiments of the present invention may be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention may be supported by those documents. Further, all terms as set forth herein may be explained by the standard documents.

Techniques described herein may be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC- FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA), etc. While the embodiments of the present invention will be described below in the context of an IEEE 802.11 system for clarity of description, this is purely exemplary and thus should not be constructed as limiting the present invention.

Architecture of Wireless Local Area Network (WLAN) System

FIG. 1 illustrates an exemplary configuration of an IEEE 802.11 system to which the present invention is applicable.

The IEEE 802.11 architecture may include a plurality of components. A WLAN that supports Station (STA) mobility transparent to upper layers may be provided through interaction between the components. A Basic Service Set (BSS) is a basic building block of an IEEE 802.11 LAN. FIG. 1 illustrates two BSSs, BSS1 and BSS2, each with two STAs that are members of the BSS (STA1 and STA2 are included in BSS1 and STA3 and STA4 are included in BSS2). Each of the BSSs covers an area in which the STAs of the BSS maintain communication, as indicated by an oval. This area may be referred to as a Basic Service Area (BSA). As an STA moves out of its BSA, it can no longer communicate directly with other members of the BSA.

An Independent Basic Service Set (IBSS) is the most basic type of BSS in the IEEE 802.11 LAN. For example, a minimum IBSS includes only two stations. A BSS, BSS1 or BSS2 which is the most basic type without other components in FIG. 1 may be taken as a major example of the IBSS. This configuration may be realized when STAs communicate directly. Because this type of LAN is often formed without pre-planning for only as long as the LAN is needed, it is often referred to as an ad hoc network.

The membership of an STA in a BSS may be dynamically changed when the STA is powered on or off or the STA moves into or out of the coverage area of the BSS. To be a member of the BSS, an STA may join the BSS by synchronization. To access all services of a BSS infrastructure, the STA should be associated with the BSS. This association may be dynamically performed and may involve use of a Distributed System Service (DSS).

Figure 2:
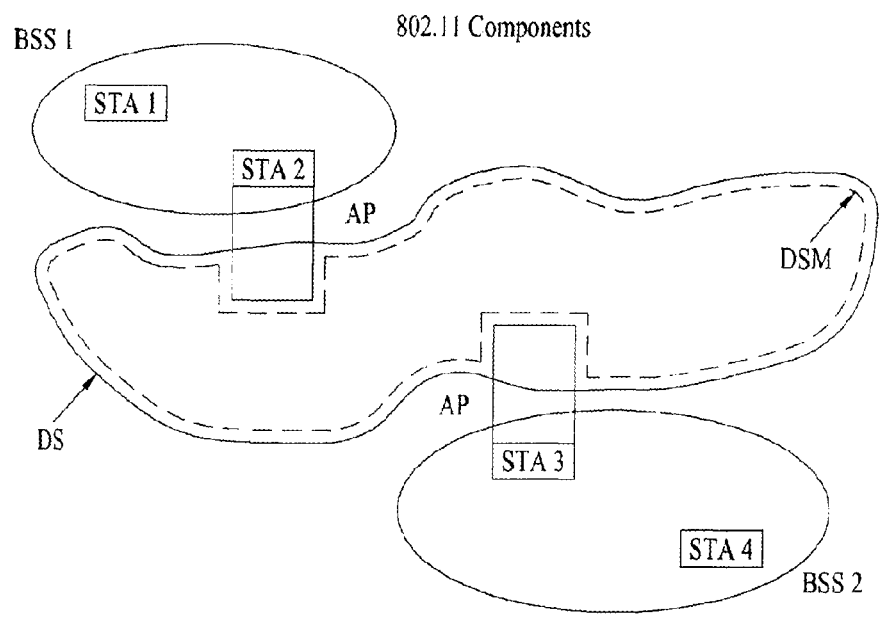
FIG. 2 illustrates another exemplary configuration of an IEEE 802.11 system to which the present invention is applicable.

FIG. 2 illustrates another exemplary configuration of the IEEE 802.11 system to which the present invention is applicable. In FIG. 2, components such as a Distribution System (DS), a Distribution System Medium (DSM), and an Access Point (AP) are added to the architecture illustrated in FIG. 1.

Physical (PHY) performance may limit direct STA-to-STA distances. While this distance limitation is sufficient in some cases, communication between STAs apart from each other by a long distance may be required. To support extended coverage, a DS may be deployed.

A DS is built from multiple BSSs that are interconnected. Specifically, a BSS may exist as a component of an extended network with a plurality of BSSs, rather than it exists independently as illustrated in FIG. 1.

The DS is a logical concept and may be specified by the characteristics of a DSM. In this regard, the IEEE 802.11 standard logically distinguishes a Wireless Medium (WM) from a DSM. Each logical medium is used for a different purpose by a different component. The IEEE 802.11 standard does not define that these media should be the same or different. The flexibility of the IEEE 802.11 LAN architecture (DS structure or other network structures) may be explained in the sense that a plurality of media are logically different. That is, the IEEE 802.11 LAN architecture may be built in various manners and may be specified independently of the physical characteristics of each implementation example.

The DS may support mobile devices by providing services needed to handle address to destination mapping and seamless integration of multiple BSSs.

An Access Point (AP) is an entity that enables its associated STAs to access a DS through a WM and that has STA functionality. Data may move between the BSS and the DS through the AP. For example, STA2 and STA3 illustrated in FIG. 2 have STA functionality and provide a function of enabling associated STAs (STA1 and STA4) to access the DS. Since all APs are basically STAs, they are addressable entities. An address used by an AP for communication on the WM is not necessarily identical to an address used by the AP for communication on the DSM.

Data that one of STAs associated with the AP transmits to an STA address of the AP may always be received at an uncontrolled port and processed by an IEEE 802.1X port access entity. If a controlled port is authenticated, transmission data (or frames) may be transmitted to the DS.

Figure 3:
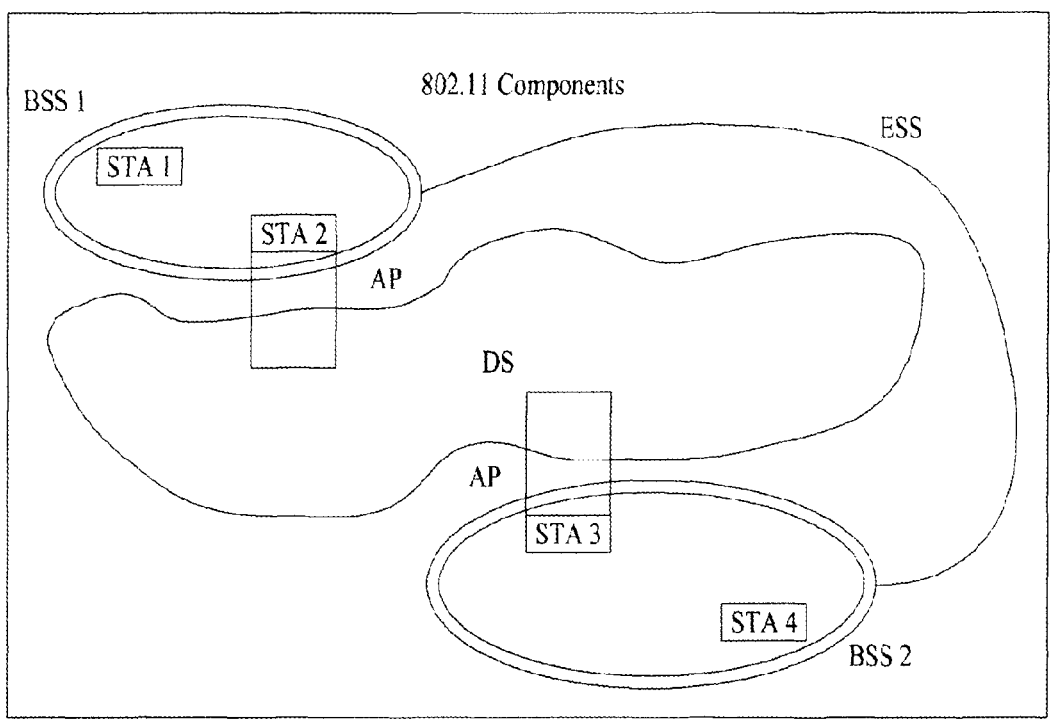
FIG. 3 illustrates another exemplary configuration of an IEEE 802.11 system to which the present invention is applicable.

FIG. 3 illustrates another exemplary configuration of the IEEE 802.11 system to which the present invention is applicable. In addition to the architecture illustrated in FIG. 2, FIG. 3 conceptually illustrates an Extended Service Set (ESS) to provide extended coverage.

A DS and BSSs allow IEEE 802.11 to create a wireless network of arbitrary size and complexity. IEEE 802.11 refers to this type of network as an ESS network. An ESS may be a set of BSSs connected to a single DS. However, the ESS does not the DS. The ESS network appears as an IBSS network to a Logical Link Control (LLC) layer. STAs within an ESS may communicate with each other and mobile STAs may move from one BSS to another (within the same ESS) transparently to the LLC layer.

IEEE 802.11 assumes nothing about the relative physical locations of the BSSs in FIG. 3. All of the followings are possible. The BSSs may partially overlap. This is commonly used to arrange contiguous coverage. The BSSs may be physically disjointed. Logically, there is no limit to the distance between BSSs. The BSSs may be physically co-located. This may be done to provide redundancy. One (or more) IBSS or ESS networks may be physically present in the same space as one (or more) ESS networks. This may arise when an ad hoc network is operating at a location that also has an ESS network, when physically overlapping IEEE 802.11 networks have been set up by different organizations, or when two or more different access and security policies are needed at the same location.

Figure 4:
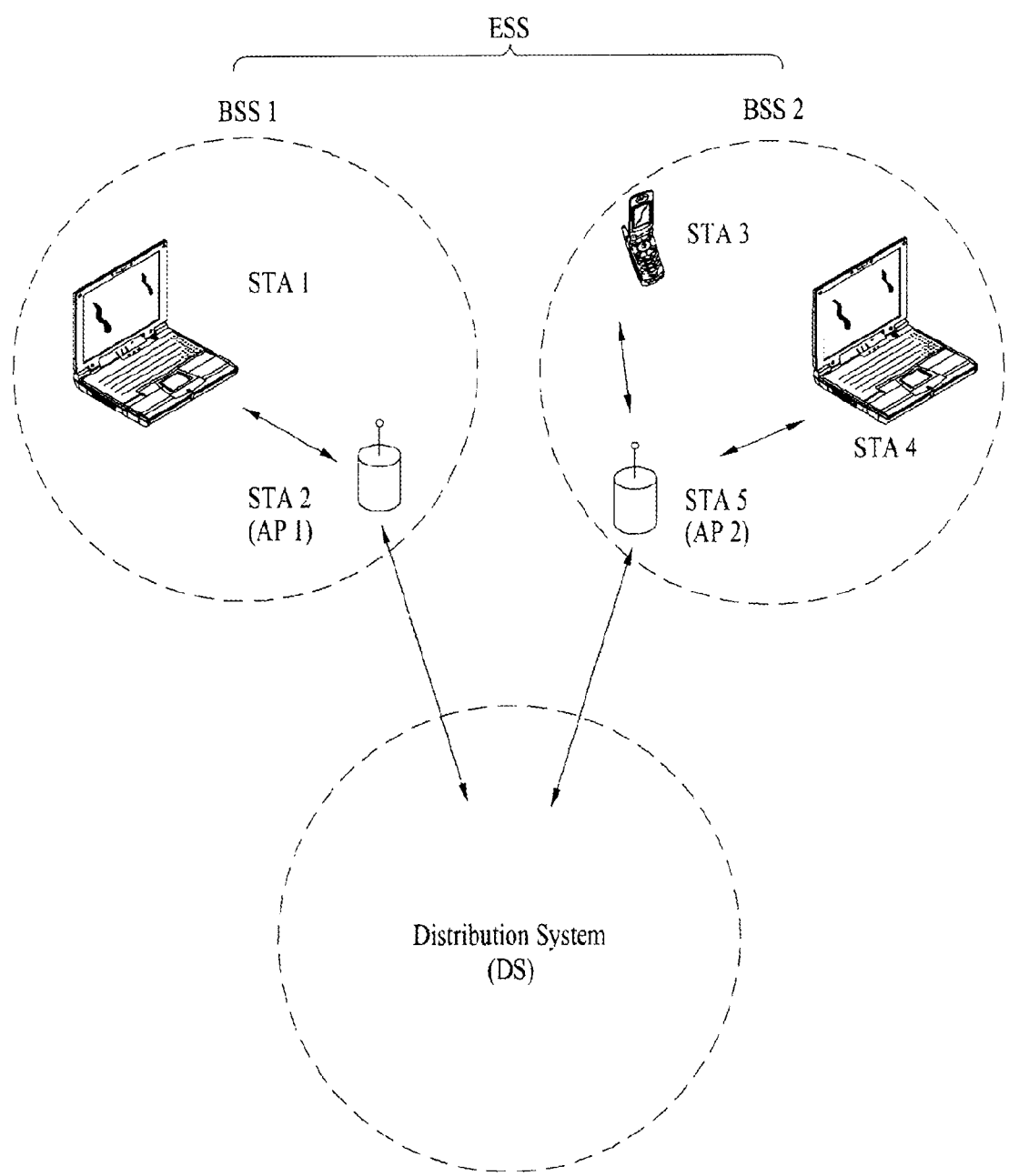
FIG. 4 illustrates an exemplary configuration of a Wireless Local Area Network (WLAN) system.

FIG. 4 illustrates an exemplary configuration of a WLAN system. In FIG. 4, an exemplary infrastructure BSS including a DS is illustrated.

In the example of FIG. 4, an ESS includes BSS1 and BSS2. In the WLAN system, an STA is a device complying with Medium Access Control/Physical (MAC/PHY) regulations of IEEE 802.11. STAs are categorized into AP STAs and non-AP STAs. The non-AP STAs are devices handled directly by users, such as laptop computers and mobile phones. In FIG. 4, STA1, STA3, and STA4 are non-AP STAs, whereas STA2 and STA5 are AP STAs.

In the following description, a non-AP STA may be referred to as a terminal, a Wireless Transmit/Receive Unit (WTRU), a User Equipment (UE), a Mobile Station (MS), a Mobile Terminal (MT), or a Mobile Subscriber Station (MSS). An AP corresponds to a Base Station (BS), a Node B, an evolved Node B (eNB), a Base Transceiver System (BTS), or a femto BS in other wireless communication fields.

Link Setup Procedure

Figure 5:
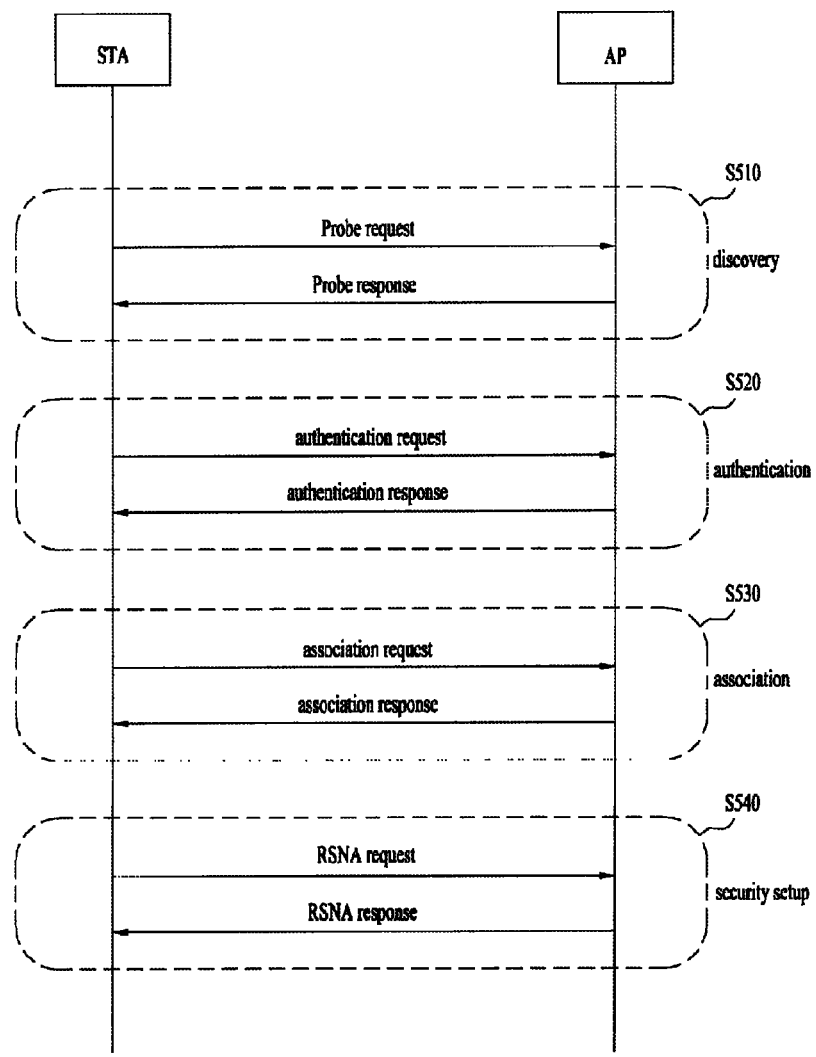
FIG. 5 is a view referred to for describing a link setup procedure in a WLAN system.

FIG. 5 is a view referred to for describing a general link setup procedure.

In order to establish a link with a network and transmit and receive data to and from the network, an STA should discover, authenticate, associate with, and perform an authentication procedure for security with the network. The link setup procedure may be referred to as a session initiation procedure or a session setup procedure. Discovery, authentication, association, and security setup of the link setup procedure may be collectively called an association procedure.

An exemplary link setup procedure will be described below with reference to FIG. 5.

In step S510, an STA may discover a network. The network discovery may include the STA's scanning. That is, the STA should search for a joinable network to access the network. The STA needs to identify a compatible network before joining a wireless network. Identification of a network present in a specific area is referred to as scanning.

Scanning is categorized into active scanning and passive scanning.

FIG. 5 illustrates a network discovery operation including active scanning, by way of example. An STA performing active scanning transmits a probe request frame and awaits reception of a response to the transmitted probe request frame, while switching between channels, to determine which AP is present around the STA. A responder transmits a probe response frame in response to the probe request frame to the STA that has transmitted the probe request frame. Here, the responder may be an STA that has transmitted a last beacon frame in a BSS of the scanned channel. Since an AP transmits a beacon frame in a BSS, the AP is a responder. Since STAs sequentially transmit a beacon frame, a responder is not the same in an IBSS. For example, an STA, which has transmitted a probe request frame in channel #1 and has received a probe response frame in channel #1, stores BSS-related information included in the received probe response frame, and moves to the next channel (e.g. channel #2). In the same manner, the STA may perform scanning on the next channel (i.e. probe request/response transmission and reception in channel #2).

While not shown in FIG. 5, the scanning may be passive scanning. An STA that performs passive scanning awaits reception of a beacon frame while moving from one channel to another. The beacon frame is one of management frames in IEEE 802.11. The beacon frame is periodically transmitted to announce the presence of a wireless network and allow a scanning STA to search for the wireless network and thus join the wireless network. In a BSS, an AP is configured to periodically transmit a beacon frame, whereas in an IBSS, STAs are configured to sequentially transmit a beacon frame. Upon receipt of a beacon frame, a scanning STA stores BSS-related information included in the beacon frame and moves to another channel. In this manner, the STA stores beacon frame information on each channel. Upon receipt of the beacon frame, the STA may store BSS-related information included in the received beacon frame, move to the next channel, and perform scanning on the next channel in the same manner.

Active scanning is more advantageous than passive scanning in terms of delay and power consumption.

After discovering the network, the STA may perform an authentication procedure in step S520. The authentication procedure may be referred to as a first authentication procedure to be distinguished from a security setup procedure performed in step S540.

The authentication procedure includes transmission of an authentication request frame to an AP by an STA and transmission of an authentication response frame to the STA by the AP in response to the authentication request frame. The authentication frame used for authentication request/response is a management frame.

The authentication frame may include information about an authentication algorithm number, an authentication transaction sequence number, a state code, challenge text, a Robust Security Network (RSN), a Finite Cyclic Group (FCG), etc. The above-mentioned information contained in the authentication frame is an exemplary part of information that may be included in the authentication request/response frame. The information may be replaced with other information or include additional information.

The STA may transmit the authentication request frame to the AP. The AP may determine whether to accept authentication of the STA based on the information included in the received authentication request frame. The AP may provide an authentication processing result to the STA in the authentication response frame.

After the STA is successfully authenticated, an association procedure may be performed in step S530. The association procedure includes transmission of an association request frame to the AP by the STA and transmission of an association response frame to the STA by the AP in response to the association request frame.

For example, the association request frame may include information related to various capabilities, a beacon listening interval, a Service Set Identifier (SSID), supported rates, supported channels, an RSN, a mobility domain, supported operating classes, a Traffic Indication Map (TIM) broadcast request, interworking service capability information, etc.

For example, the association response frame may include information associated with various capabilities, a status code, an Association Identification (AID), supported rates, an Enhanced Distributed Channel Access (EDCA) parameter set, a Received Channel Power Indicator (RCPI), a Received Signal to Noise Indicator (RSNI), a mobility domain, a timeout interval (association comeback time), an overlapping BSS scan parameter, a TIM broadcast response, a Quality of Service (QoS) map, etc.

The above-mentioned information is an exemplary part of information that may be included in the association request/response frame. The information may be replaced with other information or may include additional information.

After the STA is successfully associated with the network, a security setup procedure may be performed in step S540. The security setup process of step S540 may be referred to as an authentication procedure based on a Robust Security Network Association (RSNA) request/response. The authentication procedure of step S520 may be referred to as a first authentication procedure and the security setup procedure of step S540 may be referred to simply as an authentication procedure.

The security setup procedure of step S540 may include private key setup through 4-way handshaking, for example, by an Extensible Authentication Protocol over LAN (EAPOL) frame. In addition, the security setup procedure may be performed according to any other security scheme that is not defined in the IEEE 802.11 standard.

Evolution of WLAN

To overcome the limitations of WLAN in communication speed, IEEE 802.11n has recently been established as a communication standard. IEEE 802.11n seeks to increase network speed and reliability and extend wireless network coverage. More specifically, IEEE 802.11n supports a High Throughput (HT) of up to 540 Mbps or higher. To minimize transmission errors and optimize data rates, IEEE 802.11n is based on Multiple Input Multiple Output (MIMO) using a plurality of antennas at each of a transmitter and a receiver.

Along with the increased use of WLAN and the development of diverse WLAN-based applications, there is a pressing need for a new WLAN system that supports a higher throughput than a throughput supported by IEEE 802.11n. A next-generation WLAN system supporting a Very High Throughput (VHT) is the next version to IEEE 802.11n WLAN (e.g. IEEE 802.11ac). It is one of systems that have been recently proposed to support a data processing rate of 1 Gbps or higher in a MAC Service Access Point (SAP).

The next-generation WLAN system supports a Multi-User (MU)-MIMO transmission scheme in which a plurality of STAs simultaneously access a channel in order to efficiently utilize radio channels. In the MU-MIMO transmission scheme, an AP may transmit a packet to at least one MIMO-paired STA simultaneously.

In addition, support of a WLAN system operation in White Space (WS) is under discussion. For example, the introduction of a WLAN system in TV WS such as an idle frequency band (e.g. a 54 to 698 MHz band) due to transitioning from analog TV to digital TV has been discussed under the IEEE 802.11af standard. However, this is purely exemplary and the WS may be a licensed band that a licensed user may use with priority. The licensed user is a user who has authority to use the licensed band. The licensed user may also be referred to as a licensed device, a primary user, an incumbent user, etc.

For example, an AP and/or an STA operating in WS should protect a licensed user. For example, if a licensed user such as a microphone has already been using a specific WS channel, that is, a frequency band regulated to be divided by a specific bandwidth in the WS band, the AP and/or the STA are not allowed to use the frequency band of the WS channel in order to protect the licensed user. If the licensed user is to use a frequency band that the AP and/or STA is using for frame transmission and/or reception, the AP and/or the STA should discontinue using the frequency band.

Therefore, the AP and/or the STA needs to determine whether the specific frequency band of the WS band is available, that is, whether a licensed user occupies the frequency band. Determination as to whether a licensed user is present in a specific frequency band is referred to as spectrum sensing. Energy detection scheme, signature detection, etc. are used as a spectrum sensing mechanism. If the strength of a received signal is equal to or larger than a predetermined value or a DTV preamble is detected, the AP and/or the STA may determine that a licensed user is using the frequency band.

Machine-to-machine (M2M) communication is under discussion as a next-generation communication technology. A technical standard of supporting M2M communication has been developed as IEEE 802.11ah in the IEEE 802.11 WLAN system. M2M communication is a communication scheme involving one or more machines. M2M communication may also be called Machine Type Communication (MTC) or machine-to-machine communication. A machine is an entity that does not require direct manipulation or intervention of a user. For example, not only a meter or vending machine equipped with a wireless communication module but also a User Equipment (UE) such as a smartphone capable of automatically accessing a network and communicating with the network without user manipulation/intervention may be machines. M2M communication may include Device-to-Device (D2D) communication, communication between a device and an application server, etc. Examples of communication between a device and an application server include communication between a vending machine and a server, communication between a Point Of Sale (POS) device and a server, and communication between an electric meter, a gas meter, or a water meter and a server. M2M communication-based applications may also include security, transportation, healthcare, etc. Considering the foregoing application examples, M2M communication should support occasional transmission/reception of a small amount of data at low rate under an environment with a huger number of devices.

More specifically, M2M communication should support a large number of STAs. Although a currently defined WLAN system is based on the premise that up to 2007 STAs are associated with one AP, methods for supporting association of more (about 6000) STAs with a single AP have been discussed in M2M communication. It is expected that many applications will support/require low rates in M2M communication. To fulfill these requirements, an STA may recognize the presence or absence of data to receive based on a TIM element in the WLAN system. In this regard, methods for reducing the bitmap size of the TIM have been discussed. It is also expected that much traffic will have a very long transmission/reception interval in M2M communication. For example, a very small amount of data needs to be transmitted and received at long intervals (e.g. every month), as is the case with electric/gas/water metering. Accordingly, although more and more STAs can be associated with a single AP in the WLAN system, methods for efficiently supporting a case in which a very small number of STAs are supposed to receive data frames from the AP during one beacon interval have been discussed.

As described above, the WLAN technology is rapidly evolving. Aside from the above-described examples, other techniques for performing direct link setup, improving media streaming throughput, supporting high-speed and/or large-scale initial session setup, and supporting extended bandwidth and operating frequency are being developed.

Medium Access Mechanism

In a WLAN system complying with IEEE 802.11, a basic access mechanism of the MAC layer is Carrier Sense Multiple Access with Collision Avoidance (CSMA/CA). The CSMA/CA mechanism is also referred to as Distributed Coordination Function (DCF) of the IEEE 802.11 MAC layer, which basically adopts a "listen before talk" access mechanism. In this type of access mechanism, an AP and/or an STA may sense a wireless channel or a medium during a predetermined time period (e.g. DCF Inter-Frame Space (DIFS)) by Clear Channel Assessment (CCA) before starting transmission. If the AP and/or the STA determines that the medium is idle as a result of the sensing, the AP and/or the STA starts frame transmission using the medium. On the other hand, if the AP and/or the STA determines that the medium is occupied, the AP and/or the STA does not start its transmission. Instead, the AP and/or the STA may attempt to perform frame transmission after setting a delay time (e.g. a random backoff period) for medium access and waiting for the delay time. As it is expected that multiple STAs attempt to perform frame transmission after waiting for different time periods by applying random backoff periods, collision may be minimized.

An IEEE 802.11 MAC protocol provides a Hybrid Coordination Function (HCF) which is based on a DCF and a Point Coordination Function (PCF). The PCF is a polling-based synchronous access scheme in which periodic polling is performed periodically to allow all receiving APs and/or STAs to receive a data frame. The HCF includes Enhanced Distributed Channel Access (EDCA) and HCF Controlled Channel Access (HCCA). EDCA is a contention-based access scheme used for a provider to provide a data frame to a plurality of users, and HCCA is a contention-free channel access scheme based on polling. The HCF includes a medium access mechanism for improving QoS of a WLAN. In the HCF, QoS data may be transmitted during both a Contention Period (CP) and a Contention-Free period (CFP).

Figure 6:
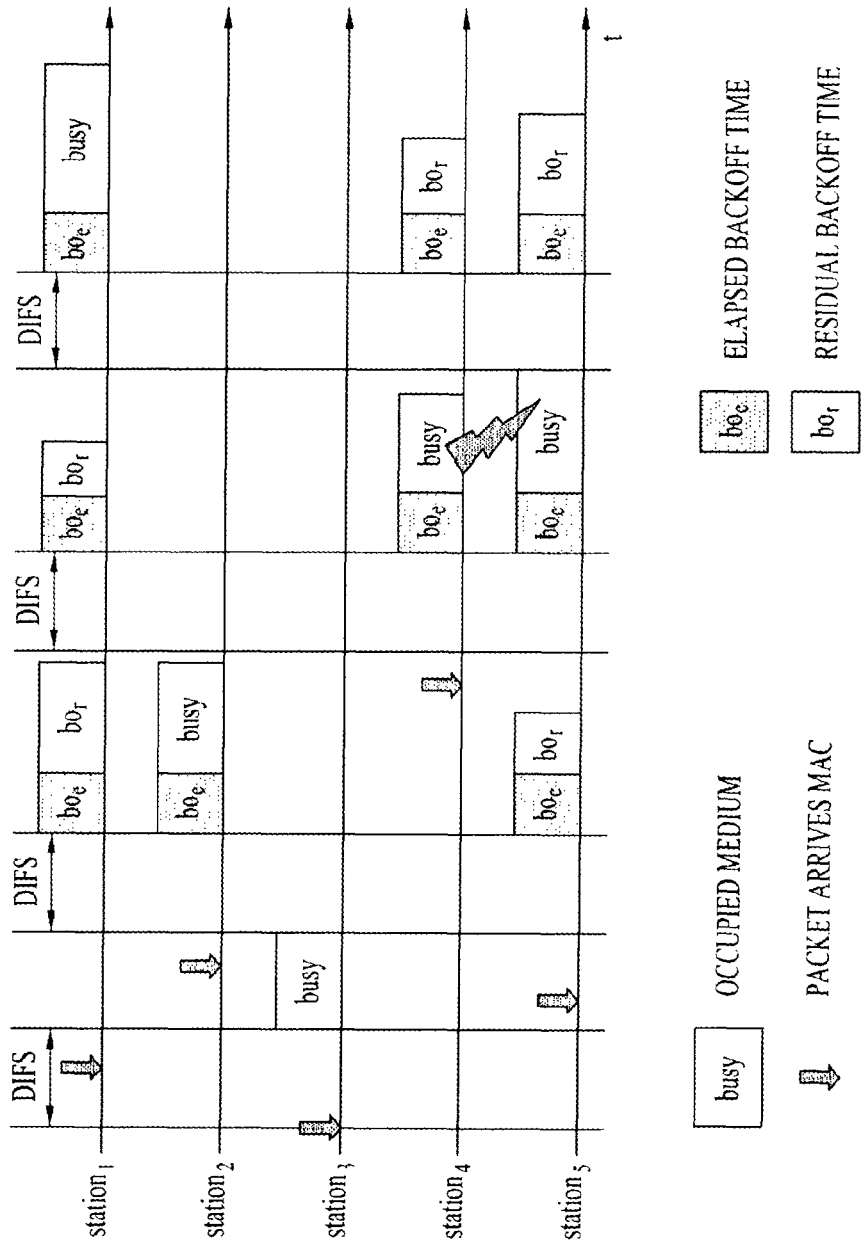
FIG. 6 is a view referred to for describing a backoff procedure.

FIG. 6 is a view referred to for describing a backoff procedure.

An operation based on a random backoff period will be described with reference to FIG. 6. If a medium transitions from an occupied or busy state to an idle state, a plurality of STAs may attempt to transmit data (or frames). To minimize collision, each STA may select a random backoff count, wait for as long a slot time period as the selected backoff count, and then attempt transmission. The random backoff count may be a pseudo-random integer and selected from a range of 0 to CW. CW is a contention window parameter. Although CWmin is initially set to CWmin, it may be doubled upon transmission failure (e.g. in the case where an ACK for a transmitted frame is not received). If CW reaches CWmax, the STAs may attempt data transmission using CWmax until the data transmission is successful. If the data transmission is successful, CW is reset to CWmin. Preferably, CW, CWmin, and CWmax may be set to $2^n-1$ (where n= 0, 1, 2, . . . ).

When the random backoff procedure starts, the STA continuously monitors the medium while counting down backoff slots according to the determined backoff count. If the medium is monitored as occupied, the STA discontinues the count-down and waits. When the medium becomes idle, the STA resumes the count-down of the remaining backoff slots.

In the illustrated case of FIG. 6, if a transmission packet arrives at the MAC layer of STA3, STA3 may immediately transmit a frame, confirming that the medium is idle. In the meantime, the remaining STAs monitor the medium as busy and wait. While the remaining STAs wait, transmission data may be generated in each of STA1, STA2, and STA5. If each of STA1, STA2, and STA5 monitors the medium as idle, the STA may wait for a DIFS and then count down backoff slots according to its selected random backoff count. In FIG. 6, STA2 selects a smallest backoff count and STA1 selects a largest backoff count That is, at the moment STA2 finishes backoff counting and then starts to transmit a frame, the residual backoff time of STA5 is shorter than that of STA1. While STA is occupying the medium, STA1 and STA5 temporarily discontinue count-down and wait. If STA2 does not occupy the medium any longer and thus the medium becomes idle, STA1 and STA5 wait for a DIFS and resume the backoff counting. That is, after counting down as many remaining backoff slots as the remaining residual backoff time, each of STA1 and STA5 may start frame transmission. Since the residual backoff time of STA5 is shorter than that of STA1, STA5 starts frame transmission. While STA2 is occupying the medium, transmission data may also be generated in STA4. If the medium becomes idle, STA4 may wait for the DIFS, count down backoff slots according to its selected random backoff count, and then start frame transmission. In FIG. 6, the residual backoff time of STA5 happens to be equal to that of STA4. In this case, collision may occur between STA4 and STA5. When collision occurs, either STA4 or STA5 does not receive an ACK, resulting in data transmission failure. Then, STA4 and STA5 may double CW values, select random backoff counts, and then count down backoff slots. While the medium is occupied for transmission of STA and STA5, STA1 may wait. Then if the medium becomes idle, STA1 may wait for the DIFS and start frame transmission after its residual backoff time.

Sensing Operation of STA

As described before, the CSMA/CA mechanism includes virtual carrier sensing as well as physical carrier sensing in which an AP and/or an STA directly senses a medium. Virtual carrier sensing is performed to overcome problems that may be encountered with medium access, such as a hidden node problem. For virtual carrier sensing, the MAC layer of the WLAN system may use a Network Allocation Vector (NAV). An AP and/or an STA, which is currently using the medium or has authority to use the medium, indicates a time left until the medium is available to anther AP and/or another STA by a NAV. Accordingly, the NAV indicates a time period scheduled for the AP and/or the STA transmitting the frame to use the medium. Upon receipt of the NAV, an STA is not allowed to access the medium during the time period. The NAV may be set, for example, according to a value set in a "duration" field of a MAC header of a frame.

A robust collision detection mechanism has been introduced to reduce the probability of collision. This robust collision detection mechanism will be described with reference to FIGS. 7 and 8. While a carrier sensing range may be different from a transmission range in real implementation, it is assumed that the carrier sensing range and the transmission range are the same, for the convenience of description.

Figure 7:
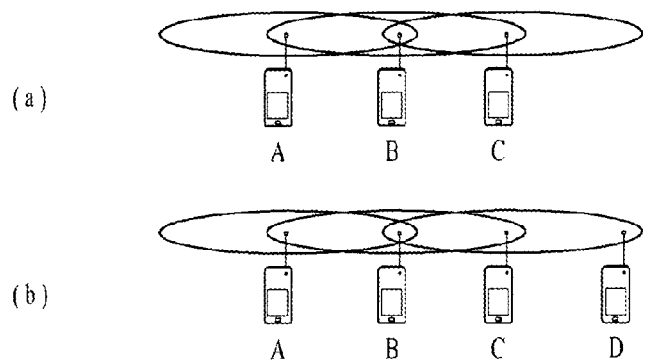
FIG. 7 is a view referred to for describing a hidden node and an exposed node.

FIG. 7 is a view referred to for describing hidden nodes and exposed nodes.

FIG. 7(a) illustrates an exemplary hidden node. In FIG. 7(a), STA A is communicating with STA B, and STA C has information to be transmitted. Specifically, STA C may determine that a medium is idle during carrier sensing before transmitting data to STA B, although STA A is transmitting information to STA B. This may occur because transmission of STA A (i.e. occupation of the medium) may not be detected at the location of STA C. As a result, STA B receives information from STA A and STA C simultaneously and thus collision occurs. Herein, STA A may be a hidden node to STA C.

FIG. 7(b) illustrates an exemplary exposed node. In FIG. 7(b), while STA B is transmitting data to STA A, STA C has information to be transmitted to STA D. If STA C performs carrier sensing, STA C may determine that a medium is occupied due to transmission of STA B. Therefore, although STA C has information to be transmitted to STA D, STA C should wait until the medium is idle since the medium is sensed as occupied. However, since STA A is actually located out of the transmission range of STA C, transmission from STA C may not collide with transmission from STA B from the viewpoint of STA A. Thus, STA C unnecessarily waits until STA B discontinues transmission. Herein, STA C may be an exposed node to STA B.

Figure 8:
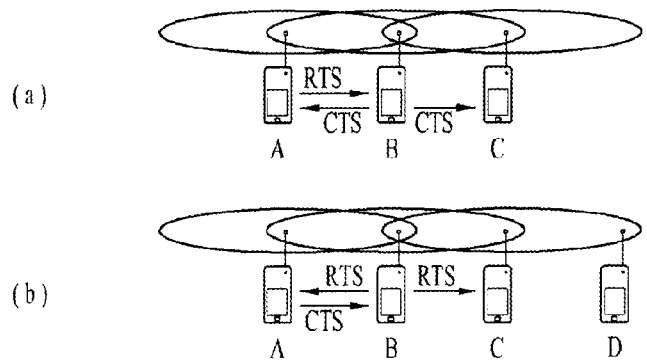
FIG. 8 is a view referred to for describing Request To Send (RTS) and Clear To Send (CTS)

FIG. 8 is a view referred to for describing Request To Send (RTS) and Clear To Send (CTS).

To efficiently utilize a collision avoidance mechanism in the exemplary situation of FIG. 7, short signaling packets such as RTS and CTS may be used. RTS/CTS between two STAs may be overheard by neighboring STA(s), so that the neighboring STA(s) may determine whether information is transmitted between the two STAs. For example, if a transmitting STA transmits an RTS frame to a receiving STA, the receiving STA may indicate to its neighboring STAs that it will receive data by transmitting a CTS frame to the peripheral STAs.

FIG. 8(a) illustrates an exemplary method for solving the hidden node problem. In FIG. 8(a), it is assumed that both STA A and STA C are to transmit data to STA B. If STA A transmits an RTS frame to STA B, STA B transmits a CTS frame to its neighboring STAs, both STA A and STA C. As a consequence, STA C waits until STA A and STA B complete data transmission, thus avoiding collision.

FIG. 8(b) illustrates an exemplary method for solving an exposed node problem. STA C may overhear RTS/CTS transmission between STA A and STA B and thus may determine that no collision will occur although STA C transmits data to another STA (e.g. STA D). That is, STA B transmits an RTS frame to all neighboring STAs and only STA A having actual transmission data may transmit a CTS frame. Because STA C receives only the RTS frame without receiving the CTS frame from STA A, it may determine that STA A is located outside the carrier sensing range of STA C.

Power Management

As described before, an STA should perform channel sensing before transmission and reception in a WLAN system. Continuous channel sensing causes continuous power consumption of the STA. Considering that power consumption in a reception state is almost the same as power consumption in a transmission state, maintaining the reception state imposes a great load on a power-limited STA (i.e. an STA operated by a battery). Therefore, if the STA is kept in a reception standby state to continuously sense a channel, the STA inefficiently consumes power, without any special advantage in terms of WLAN throughput. In avert this problem, the WLAN system supports a Power Management (PW) mode for an STA.

The PM mode of the STA is classified into an active mode and a Power Save (PS) mode. The STA basically operates in the active mode. The STA operating in the active mode is kept awake. In the awake state, the STA may perform normal operations including frame transmission and reception, channel scanning, etc. On the other hand, the STA switches between a sleep state and an awake state in the PS mode. In the sleep state, the STA operates with minimum power, without performing frame transmission and reception and channel scanning.

As the STA operates longer in the sleep state, the STA consumes less power, thus lengthening an operation time. However, the STA may not stay in the sleep state unconditionally because it is impossible to transmit or receive a frame in the sleep state. In the presence of a frame to be transmitted to an AP, a sleep-state STA may switch to the awake state and then transmit the frame in the awake state. If the AP has a frame to be transmitted to the STA, the sleep-state STA is unable to receive the frame and does not know the presence of a frame to be received. Accordingly, the STA may need to switch to the awake state in every specific period to determine the presence or absence of a frame to receive (or to receive a frame in the presence of the frame to receive).

Figure 9:
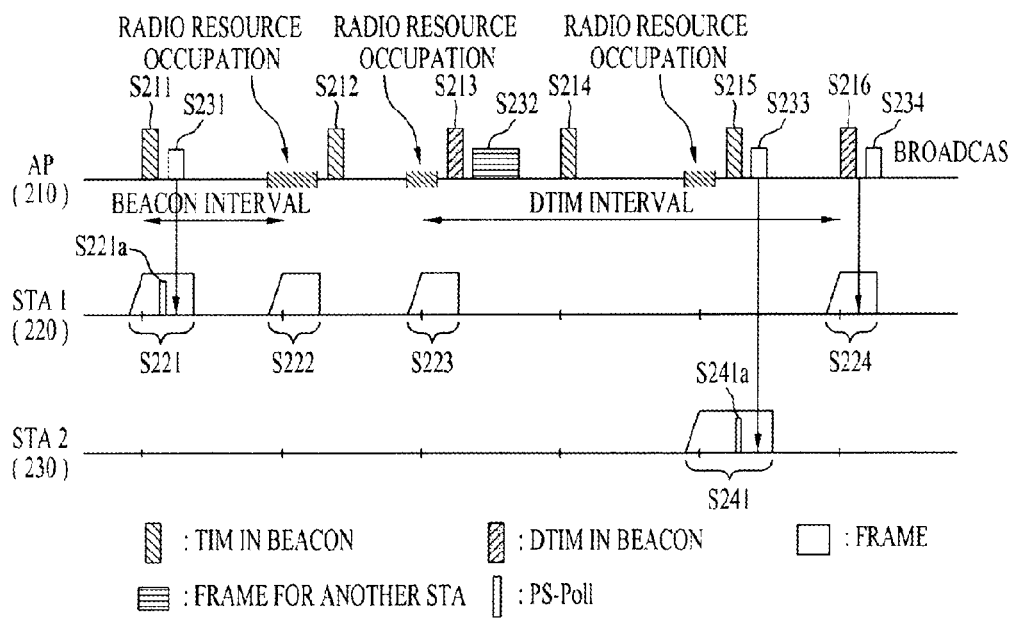
FIG. 9 is a view referred to for describing a power management operation.

FIG. 9 is a view referred to for describing a power management operation.

Referring to FIG. 9, an AP 210 transmits a beacon frame to STAs within a BSS at every predetermined interval (S211, S212, S213, S214, S215, and S216). The beacon frame includes a TIM information element. The TIM information element includes information indicating that the AP 210 has buffered traffic for STAs associated with the AP 210 and will transmit frames to the STAs. The TIM information element includes a TIM indicating a unicast frame and a Delivery Traffic Indication Map (DTIM) indicating a multicast or broadcast frame.

The AP 210 may transmit a DTIM once every three beacon frame transmissions. Each of STA1 220 and STA2 222 operate in the PS mode. STA1 220 and STA2 222 may be configured to switch from the sleep state to the awake state at every wakeup interval of a predetermined period and to receive the TIM information element from the AP 210. Each STA may calculate a switching time at which it will switch to the awake state based on its own local clock. In FIG. 9, it is assumed that the STAs have the same clock as the AP.

For example, the predetermined wakeup interval may be set in such a manner that STA1 220 may switch to the awake state in each beacon interval to receive the TIM element. Accordingly, when the AP 210 first transmits the beacon frame (S211), STA1 220 may switch to the awake state (S212). STA1 220 may receive the beacon frame and acquire the TIM information element from the beacon frame. If the TIM information element indicates the presence of a frame to be transmitted to STA1 220, STA1 220 may transmit to the AP 210a a Power Save-Poll (PS-Poll) frame requesting transmission of the frame (S221a). The AP 210 may transmit the frame to STA1 220 in response to the PS-Poll frame (S231). Upon complete receipt of the frame, STA1 220 returns to the sleep state.

When the AP 210 transmits the beacon frame at a second time, another device accesses the medium and thus the medium is busy. Therefore, the AP 210 may not transmit the beacon frame at the accurate beacon interval. Instead, the AP 210 may transmit the beacon frame at a delayed time (S212). In this case, although STA1 220 switches to the awake state at the beacon interval, STA1 fails to receive the delayed beacon frame and thus returns to the sleep state (S222).

When the AP 210 transmits the beacon frame at a third time, the beacon frame may include a TIM information element configured as a DTIM. However, since the medium is busy, the AP 210 transmits the beacon frame at a delayed time (S213). STA1 220 may switch to the awake state at the beacon interval and acquire the DTIM from the beacon frame received from the AP 210. It is assumed that the DTIM indicates the absence of a frame to be transmitted to STA1 220 and the presence of a frame to be transmitted to another STA. Then, STA1 220 may return to the sleep state, determining that there is no frame to be received. After transmitting the beacon frame, the AP 210 transmits the frame to the corresponding STA (S232).

The AP 210 transmits the beacon frame at a fourth time (S214). However, since STA1 220 has not acquired information indicating the presence of traffic buffered for STA1 220 from the previous twice-received TIM information element, STA1 220 may adjust the wakeup interval to receive the TIM information element. Or if a beacon frame transmitted by the AP 210 includes signaling information for adjusting the wakeup interval of STA1 220, the wakeup interval of the STA1 220 may be adjusted. In this example, STA1 220 may be configured to change its operation state from one wake-up in every beacon interval to one wake-up in every 3 beacon intervals, in order to receive a TIM information element. Therefore, when the AP 210 transmits a fourth beacon frame (S214) and transmits a fifth beacon frame (S215), STA1 220 is kept in the sleep state and thus may not acquire a corresponding TIM information element.

When the AP 210 transmits the beacon frame at a sixth time (S216), STA1 220 may switch to the awake state and acquire a TIM information element from the beacon frame (S224). The TIM information element is a DTIM indicating the presence of a broadcast frame. Accordingly, STA1 220 may receive the broadcast frame from the AP 210 without transmitting a PS-Poll frame to the AP 210 (S234). In the meantime, a wakeup interval configured for STA2 230 may be set to be longer than the wakeup interval of STA1 220. Thus, when the AP 210 transmits the beacon frame at the fifth time (S215), STA2 230 may enter the awake state and receive the TIM information element (S241). STA2 230 may determine the presence of a frame to receive by the TIM information element and transmit a PS-Poll frame to the AP 210 to request frame transmission (S241*a*). The AP 210 may transmit the frame to STA2 230 in response to the PS-Poll frame (S233).

To implement the PS mode as illustrated in FIG. 9, a TIM information element includes either a TIM indicating the presence or absence of a frame to be transmitted to an STA or a DTIM indicating the presence or absence of a broadcast/multicast frame. The DTIM may be configured by setting a field in the TIM information element.

Figure 10:
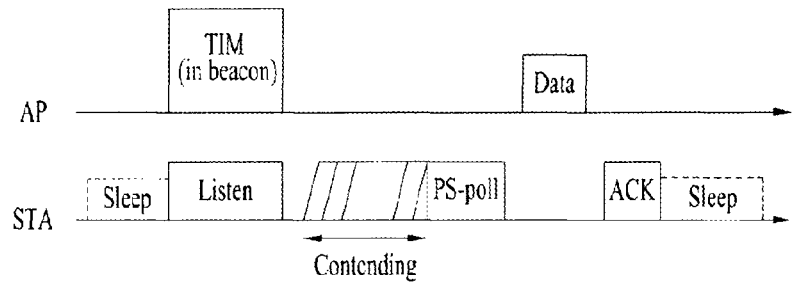
FIGS. 10, 11, and 12 are views referred to for describing an operation of a Station (STA) that has received a Traffic Indication Map (TIM) in detail.
Figure 11:
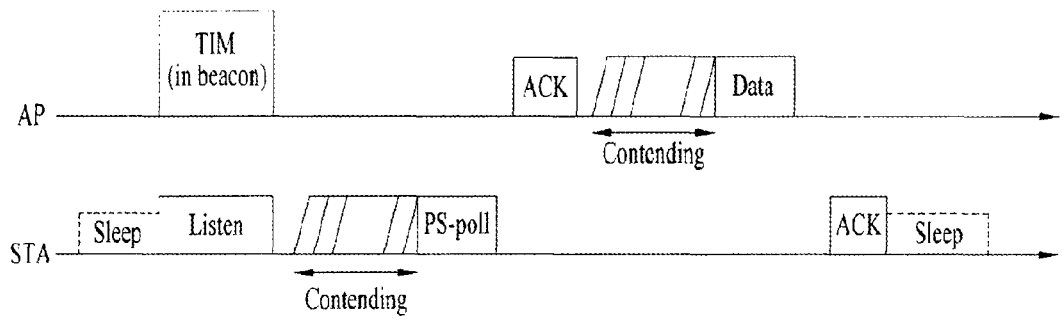
Figure 12:
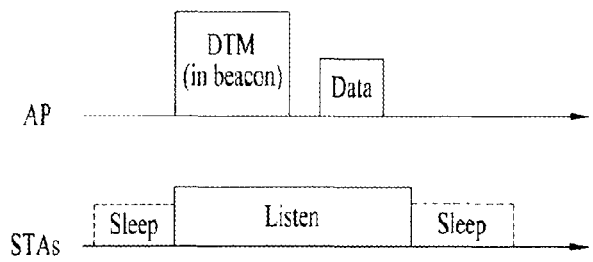

FIGS. 10, 11, and 12 are views referred to for describing an operation of an STA that has received a TIM in detail.

Referring to FIG. 10, an STA switches from a sleep state to an awake state to receive a beacon frame including a TIM element from an AP. The STA may determine the presence of buffered traffic directed to the STA by interpreting the received TIM element. After contending with other STAs to access a medium for transmission of a PS-Poll frame, the STA may transmit a PS-Poll frame requesting data frame transmission to the AP. Upon receipt of the PS-Poll frame from the STA, the AP may transmit the frame to the STA. The STA may receive a data frame and then transmit an ACKnowledgment (ACK) frame to the AP in response to the received data frame. Subsequently, the STA may return to the sleep state.

As illustrated in FIG. 10, the AP may receive the PS-Poll frame from the STA and transmits the data frame after a predetermined time (e.g. a Short InterFrame Space (SIFS)) according to an immediate response scheme. If the AP does not prepare a data frame to be transmitted to the STA during the SIFS after receiving the PS-Poll frame, the AP may operate according to a deferred response scheme, which will be described with reference to FIG. 11.

As in the example of FIG. 10, an STA switches from a sleep state to an awake state, receives a TIM from an AP, and transmits a PS-Poll frame to the AP through contention in the illustrated case of FIG. 11. If the AP does not prepare a data frame during an SIFS after receiving the PS-Poll frame, the AP may transmit an ACK frame to the STA, instead of the data frame. If the AP prepares the data frame after transmitting the ACK frame, the AP may transmit the data frame to the STA after contention. The STA may transmit, to the AP, an ACK frame indicating that the data frame has been received successfully and may switch to the sleep state.

FIG. 12 illustrates an exemplary case in which an AP transmits a DTIM. STAs may switch from the sleep state to the awake state to receive a beacon frame including a DTIM element from the AP. The STAs may determine from the received DTIM that a multicast/broadcast frame will be transmitted to them. After transmitting the beacon frame including the DTIM, the AP may directly transmit data (i.e. the multicast/broadcast frame) without receiving a PS-Poll frame. The STAs receives the data in the awake state in which they are kept after receiving the beacon frame including the DTIM. Upon complete receipt of the data, the STAs may return to the sleep state.

TIM Structure

In the PS-mode operation method based on the TIM (or DTIM) protocol described above with reference to FIGS. 9 to 12, an STA may determine whether there is a data frame to be transmitted to the STA by STA identification information included in a TIM element. The STA identification information may be information related to an AID which is allocated to an STA when the STA is associated with an AP.

An AID is used as a unique ID of each STA within one BSS. For example, the AID may be one of 1 to 2007 in the current WLAN system. In the currently defined WLAN system, 14 bits may be allocated to an AID in a frame transmitted by an AP and/or an STA. Although the AID value may be assigned up to 16383, the values of 2008 to 16383 are reserved.

An already defined TIM element is not suitable for M2M applications through which many STAs (for example, more than 2007 STAs) may be associated with one AP. If the conventional TIM structure is extended without any change, a TIM bitmap gets too large in size. As a consequence, the extended TIM structure may not be supported using a legacy frame format and is inappropriate for M2M communication for which low-rate applications are considered. In addition, it is expected that a very small number of STAs are supposed to receive a data frame during one beacon interval. Therefore, considering the afore-mentioned M2M communication application examples, it is expected that the size of a TIM bitmap will be increased but most bits of the TIM bitmap are set to zero (0) in many cases. In this context, there is a need for a method for efficiently compressing a bitmap.

Conventionally, successive zeroes at the start of a bitmap are omitted and represented by an offset (or a starting point) in order to compress the bitmap. However, if there are buffered frames for a small number of STAs but the AID values of the STAs are highly different from one another, compression efficiency is not high. For example, if buffered frames are destined for only two STAs having AIDs of 10 and 2000, respectively, the resulting compressed bitmap is of length 1990 and has all zeros except for non-zeroes at both ends. If a small number of STAs can be associated with one AP, inefficiency of bitmap compression does not matter much. On the contrary, if the number of STAs associable with one AP increases, such inefficiency may degrade overall system performance.

To overcome the problem, AIDs may be divided into a plurality of groups, for more effective data transmission. A predetermined Group ID (GID) is allocated to each group. AIDs allocated on a group basis will be described below with reference to FIG. 13.

Figure 13:
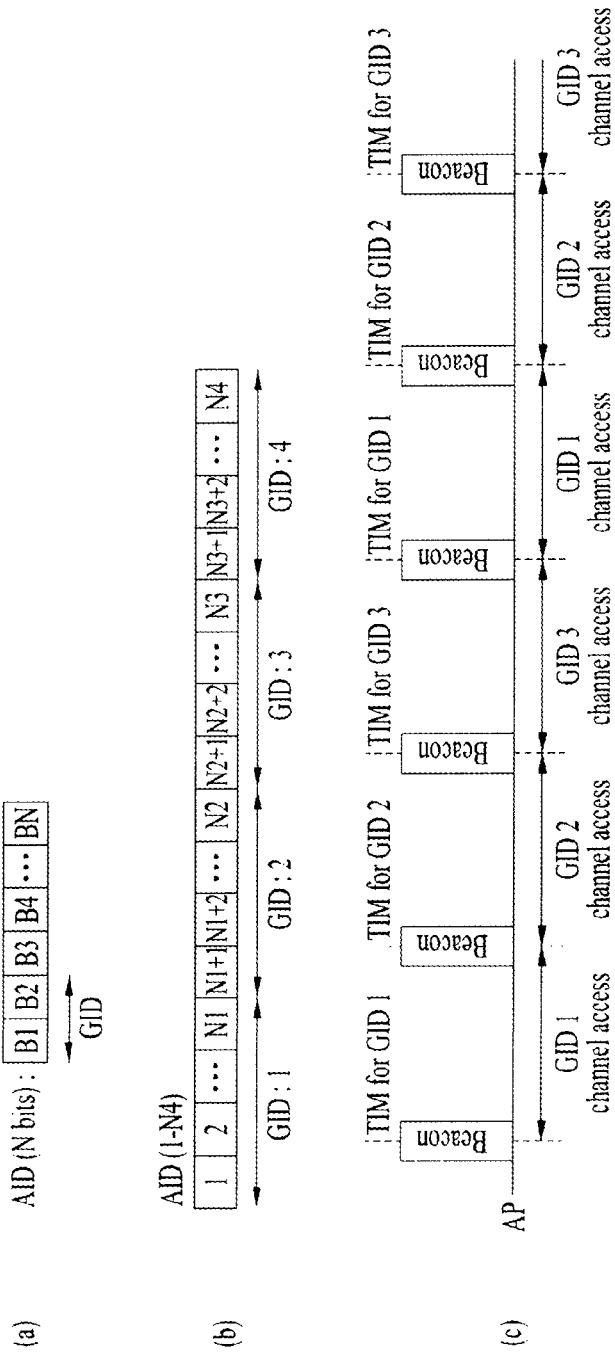
FIG. 13 is a view referred to for describing group-based Association Identifiers (AIDs)

FIG. 13(*a*) illustrates an example of AIDs allocated on a group basis. In FIG. 13(*a*), a few first bits of an AID bitmap may be used to indicate a GID. For example, 4 GIDs may be represented in the first 2 bits of the AID bitmap. If the AID bitmap includes N bits in total, the first 2 bits (B1 and B2) may represent the GID of the AIDs.

FIG. 13(*a*) illustrates another example of AIDs allocated on a group basis. In FIG. 13(*b*), GIDs may be allocated according to the positions of the AIDs. In this case, AIDs having the same GID may be represented by an offset and a length. For example, if GID 1 is represented by offset A and length B, this means that AIDs ranging from A to A+B−1 in a bitmap have GID 1. For example, it is assumed in FIG. 13(b) that AIDs ranging from 1 to N4 are divided into four groups. In this case, AIDs belonging to GID 1 are 1 to N1 and thus may be represented by offset 1 and length N1. AIDs belonging to GID 2 may be represented by offset N1+1 and length N2−N1+1, AIDs belonging to GID 3 may be represented by offset N2+1 and length N3−N2+1, and AIDs belonging to GID 4 may be represented by offset N3+1 and length N4−N3+1.

As this group-based AID allocation enables channel access during different time periods according to GIDs, lack of TIM elements for a large number of STAs may be overcome and data may be transmitted and received efficiently, as well. For example, channel access is available only to an STA(s) of a specific group, while channel access may be restricted for the other STA(s), during a specific time period. The specific time period during which channel access is available only to the STA(s) of the specific group may be called a Restricted Access Window (RAW).

With reference to FIG. 13(c), GID-based channel access will be described below. FIG. 13(c) illustrates an exemplary channel access mechanism based on beacon intervals, when AIDs are divided into three groups. A first beacon interval (or a first RAW) is a time period during which channel access is allowed for STAs having the AIDs of GID 1 and denied for the STAs belonging to the other GIDs. To implement this mechanism, a TIM element only for the AIDs of GID 1 is included in a first beacon. A TIM element only for the AIDs of GID 2 is included in a second beacon frame. Accordingly, channel access is allowed only for STAs having the AIDs of GID 2 during a second beacon interval (or a second RAW). A TIM element only for the AIDs of GID 3 is included in a third beacon frame, so that channel access may be allowed only for STAs having the AIDs of GID 3 during a third beacon interval (or a third RAW). A TIM element only for the AIDs of GID 1 is included in a fourth beacon frame, so that channel access may be allowed only for the STAs having the AIDs of GID 1 during a fourth beacon interval (or a fourth RAW). In the same manner, channel access may be allowed only for the STAs of a specific group indicated by a TIM included in a corresponding beacon frame during each of beacon intervals following the fifth beacon interval (or during each of RAWs following the fifth RAW).

While the order of allowed GIDs is cyclic or periodic according to the beacon intervals in FIG. 13(c), this should not be construed as limiting the present invention. That is, as only an AID(s) having a specific GID(s) may be included in a TIM element, channel access may be allowed only for an STA(s) having the specific AID(s) and denied for the remaining STA(s), during a specific time interval (e.g. a specific RAW).

The above group-based AID allocation scheme may be referred to as a hierarchical TIM structure. That is, a total AID space is divided into a plurality of blocks and channel access is allowed only for an STA(s) (i.e. an STA(s) of a specific group) corresponding to a specific block(s) having non-zero values. Therefore, since a large-sized TIM is divided into small-sized blocks/groups, an STA may easily maintain TIM information and the blocks/groups may be easily managed according to the class, QoS, or usage of the STA. Although FIG. 13 exemplarily illustrates a 2-level layer, a hierarchical TIM structure with two or more levels may be configured. For example, a total AID space may be divided into a plurality of page groups, each page group may be divided into a plurality of blocks, and each block may be divided into a plurality of sub-blocks. Then, the example of FIG. 13(a) may be extended in such a manner that first N1 bits of an AID bitmap represent a Page ID (i.e. PID), the next N2 bits represent a block ID, the next N3 bits represent a sub-block ID, and the remaining bits represent the position of STA bits included in a sub-block.

In the following examples of the present invention, STAs (or AIDs allocated to the respective STAs) may be divided into predetermined hierarchical groups and managed in various manners. However, the group-based AID allocation scheme is not limited to the specific examples.

Improved Channel Access Scheme

In the case where AIDs are allocated/managed on a group basis, STAs belonging to a specific group may access a channel only during a "group channel access interval" (or RAW) allocated to the group. If an STA supports an M2M application, traffic may be generated for the STA over a long period (e.g., tens of minutes or a few hours). Because the STA does not need to frequently maintain an awake state, it is preferred that the STA operates in a sleep state and switches to the awake state from time to time (i.e., a long wakeup interval is set for the STA). Such an STA having a long wakeup interval may be referred to as a "long sleeper" or an STA operating in a "long sleep" mode. Setting of a long wakeup interval is not limited to M2M communication. In a general WLAN operation, a long wakeup interval may be set according to the state of an STA or under circumstances.

Once a wakeup interval is set, an STA may determine whether the wakeup interval has elapsed based on its local clock. Since the local clock of the STA generally uses a low-price oscillator, the local clock may have a high error probability. If the STA operates in the long sleep mode, errors may become serious over time. As a result, the time synchronization of the STA that wakes up from time to time may not coincide with that of an AP. For example, although the STA calculates a timing at which it may receive a beacon frame and switches to the awake state based on the calculated timing, the STA may fail to receive an actual beacon from the AP at the timing. That is, the STA may miss a beacon frame due to clock drift and the beacon loss may occur more often when the STA operates in the long sleep mode.

Figure 14:
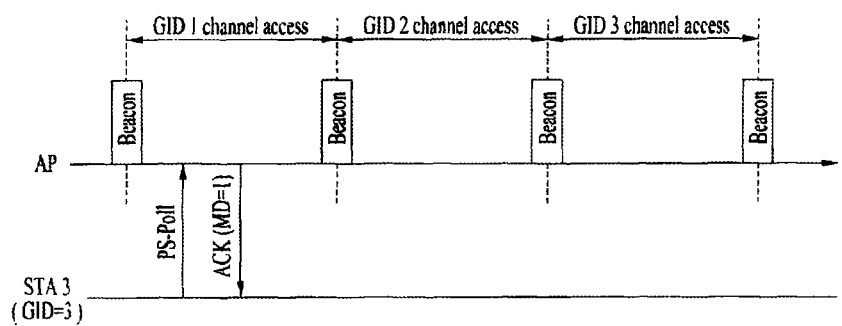
Figure 15:
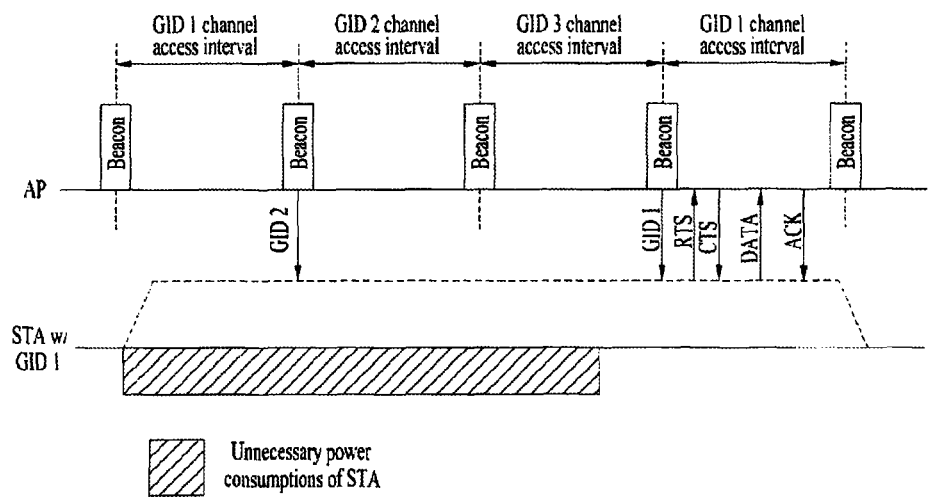

FIGS. 14, 15, and 16 illustrate exemplary operations of an STA, when group channel access intervals are set.

Referring to FIG. 14, STA3 belongs to group 3 (i.e. GID=3). STA3 may wake up in a channel access interval allocated to group 1 (i.e. GID=1) and transmit a PS-Poll frame to an AP, requesting frame transmission from the AP to STA3. Upon receipt of the PS-Poll frame from STA3, the AP transmits an ACK frame to STA3. In the presence of buffered data to be transmitted to STA3, the AP may provide information indicating it (i.e., the presence of buffered data to be transmitted to STA3) to STA3 by the ACK fame. For example, the information may be indicated by setting a 1-bit "More Data (MD)" field to 1 (i.e., MD=1) in the ACK frame.

Since STA3 transmits the PS-Poll frame at a time point within a channel access interval of group 1, even though the AP has data to be transmitted to STA3, the AP does not transmit the data immediately to STA3. Instead, the AP transmits the data to STA3 in a channel access interval allocated to group 3 (GID 3 channel access in FIG. 14).

STA3 awaits reception of the data from the AP because it has received the ACK frame with MD=1 from the AP. That is, since STA3 has not received a beacon frame shortly after waking up, STA3 transmits the PS-Poll frame to the AP, assuming that STA3 may have woken up in the channel access interval allocated to the group of STA3 and the AP may have data to be transmitted to STA3. Or STA3 may transmit the PS-Poll frame to the AP to receive data that might be destined for STA3, assuming that time is not synchronized due to its long-sleep mode operation. As the ACK frame received from the AP indicates the presence of data for STA3, STA3 awaits reception of the data, on the assumption that a current channel access interval is the channel access interval available to STA3. Even though data reception is not allowed for STA3, STA3 unnecessarily consumes power until time synchronization is acquired based on information included in a next beacon frame.

Especially when STA3 operates in the long sleep mode, STA3 does not receive a beacon frame often. Therefore, STA3 may consume power unnecessarily, for example, by performing CCA even though the current channel access interval is not for STA3.

FIG. 15 illustrates a case where an STA having GID 1 (i.e. belonging to group 1) misses a beacon frame at its wake-up timing. As the STA fails to receive a beacon frame with the GID (or PID) allocated to the STA, the STA waits in the awake state until receiving a beacon frame with its GID (or PID). That is, even though the STA wakes up in a channel access interval allocated to the STA, the STA does not know whether the wake-up timing falls into the channel access interval allocated to its group because it has not checked whether a TIM included in a beacon frame includes its GID (or PID).

As described above, the STA, which has switched from the sleep state to the awake state, is kept in the awake state until receiving a fourth beacon frame with its GID (i.e. GID 1) after missing a first beacon frame, thereby consuming power unnecessarily. After the unnecessary power consumption, the STA may eventually receive a beacon frame including GID 1 and may thus perform RTS transmission, CTS reception, data frame transmission, and ACK reception based on the received beacon frame.

FIG. 16 illustrates a case where an STA wakes up in a channel access interval allocated to another group. For example, an STA with GID 3 may wake up in a channel access interval for GID 1. That is, after waking up, the STA with GID 3 waits until receiving a beacon frame including its GID, consuming power unnecessarily. Upon receipt of a TIM indicating GID 3 in a third beacon frame, the STA may recognize a channel access interval allocated to its group and perform data transmission and ACK reception by RTS- and CTS-based CCA.

The present invention provides an improved channel access scheme for preventing or reducing unnecessary power consumption of an STA, when group-based restricted access is allowed as described above. Particularly, the channel access scheme of the present invention may be useful for an STA operating in the long sleep mode having a high probability of time asynchronization.

According to the present invention, when an STA, which has switched from the sleep state to the awake state, transmits a frame including information related to a channel access request (i.e. a first frame) to an AP, the AP replies to the STA with a frame including information indicating whether channel access is accepted (i.e., a second frame). Therefore, unnecessary power consumption of the STA can be prevented. The information indicating whether channel access is accepted may be timing information, for example. The first frame may be an existing PS-Poll frame or a new frame (e.g., a Channel Access Request (CA-REQ) frame) proposed by the present invention. The second frame may be an existing ACK or Access Control frame, or a new frame (e.g., a Channel Access Response (CA-RSP) frame) proposed by the present invention. Now, specific examples of the present invention will be described below.

According to the present invention, a long sleep-mode STA may access a channel directed from an AP to the STA (i.e. a Downlink (DL) channel) or a channel directed from the STA to the AP (i.e., an Uplink (UL) channel) without receiving a beacon frame from the AP (or without waiting in the awake state until receiving a beacon frame including a GID (or PID) of the STA).

In this case, the STA may request channel access to the AP by transmitting a first frame to the AP. The first frame may be a PS-Poll frame or a CA-REQ frame in the present invention, which should not be construed as limiting the present invention. A specific frame including information described in various examples of the present invention may be referred to as the first frame.

It may be defined that the first frame is transmittable at any time. It may also be defined that the first frame is transmitted even when the STA does not have knowledge of the presence or absence of DL data directed to the STA (e.g., even when the STA fails to receive a TIM).

FIG. 17 illustrates exemplary formats of a CA-REQ frame according to the present invention.

A frame may typically include a MAC header, payload, and a Frame Check Sequence (FCS). Some frames may not have payload. The first two octets (i.e., 16 bits) of the MAC header is a Frame Control field. The Frame Control field may include a Protocol Version field, a Type field, a Subtype field, an MD field, etc. The last two octets of the frame may be the FCS.

Referring to FIG. 17(a), the CA-REQ frame may include an ID (i.e. AID) of an STA and an ID (i.e. BSSID) of an AP. An AID field may be filled with the AID of the STA and a BSSID field may be filled with the ID of the AP which is a destination of the CA-REQ frame transmitted by the STA. The Type field and the Subtype field of the Frame Control field may indicate whether this frame is a CA-REQ frame. If the STA has UL data to be transmitted to the AP, the STA may transmit a CA-REQ frame with an MD bit set to 1 in the Frame Control field to the AP. Since the AID field of the CA-REQ frame includes a GID (or PID) (i.e. the AP may determine the GID (or PID) of a group to which the corresponding AID belongs from the AID of the STA), the STA does not need to include a GID (or PID) field in the CA-REQ frame.

Additionally, the GID of the STA may be indicated by a hierarchical AID structure or by a specific AID range (refer to FIG. 13(a)). Therefore, a CA-REQ frame may be configured to include an AID field and a GID field, as illustrated in FIG. 17(b).

In another example, the CA-REQ frame may include a UL/DL indicator field in addition to the exemplary structure of FIG. 17(a). The UL/DL indicator field may indicate whether the CA-REQ frame is an access request for a DL channel or a UL channel.

A detailed description of embodiments of the present invention using various examples of the first frame will follow a description of formats of the second frame.

Upon receipt of a first frame (e.g., a PS-Poll frame or a CA-REQ frame), the AP may transmit a second frame (e.g., an ACK frame, an Access Control frame, or a CA-RSP frame) to the STA in response to the first frame.

FIGS. 18, 19, and 20 illustrates exemplary formats of a CA-RSP frame according to the present invention.

Referring to FIGS. 18, 19, and 20, each of exemplary CA-RSP frames may basically include a Frame Control field, an AID field, a BSSID field, and an FCS field. A Type field and a Subtype field included in the Frame Control field may indicate whether this frame is a CA-RSP frame. If an AP has DL data to be transmitted to an STA, the AP may transmit a CA-RSP frame with an MD bit set to 1 in a Frame Control Field to the STA.

Additionally, the CA-RSP frame may include information indicating explicitly/implicitly whether channel access is accepted for an STA which has not received a beacon frame (or an STA which has transmitted a first frame) after waking up. This information may be referred to as response information.

Referring to FIG. 18, the response information may include time stamp information (FIG. 18(*a*)), ACK information (FIG. 18(*b*)), Channel Access Start Offset (CASO) information and Granted Channel Access Duration (GCAD) information (FIG. 18(*c*)), or Current Access Group Number (CAGN) information and Next Access Group Start Offset (NAGSO) information (FIG. 18(*d*)). The length (L, L1, or L2 in FIG. 18) of each field may be set to a predetermined value.

FIG. 19 illustrates an exemplary format of a CA-RSP frame in which response information includes a Response type field and a Body part. The length of the Response type field may be 3 bits. Then, if the response information is 1 octet, the Body part may be 5 bits long. If the response information is 2 octets, the Body part may be 13 bits long.

Referring to FIG. 20, the Body part of the response information may include channel access duration information (FIG. 20(*a*)), channel access duration information and time stamp information (FIG. 20(*b*)), Current Channel Access Group ID (CCAGID) and NAGSO information (FIG. 20(*c*)), CCAGID information, NAGSO information, time stamp information, and GCAD information (FIG. 20(*d*)), or new group ID (or new AID) information (FIG. 20(*e*)).

The above-described information included in the second frame (or ACK, Access Control, or CA-RSP frame) is purely exemplary. Thus, one or more of the various examples illustrated in FIGS. 18, 19, and 20 may be implemented in combination.

The embodiments of the present invention using the first frame and the second frame will be described below in great detail.

FIGS. 21 to 34 illustrate exemplary improved channel access operations using the first and second frames according to the present invention.

Referring to FIG. 21, STA3 with GID 3, which has not received a beacon after waking up, may transmit a first frame (e.g., a CA-REQ frame) to an AP. That is, STA3 may transmit the CA-REQ frame to the AP at a timing outside a channel access interval allocated to a group to which STA3 belongs. The AP may transmit a second frame (e.g., a CA-RSP frame) to the STA in response to the received first frame. An MD field may be set to 1 in the second frame to indicate the presence of DL data to be transmitted to STA3.

The second frame may further include time stamp information (see FIG. 18(*a*)). STA3 may acquire accurate time synchronization with the AP based on a time stamp value included in the second frame. After the time synchronization, the STA may calculate a substantially accurate next beacon transmission timing and operate in the sleep mode until the next beacon transmission timing. As STA3 wakes up at the next beacon transmission timing and successfully receives a beacon, STA 3 may acquire current group information (i.e., information indicating a group to which channel access is available). STA3 may calculate a channel access allowed time for its group based on the acquired current group information. For example, if STA3 determines the channel access interval of its group to come after a third beacon, STA3 may return to the sleep mode, thus saving power. Then STA3 may wake up at the timing of the third beacon, attempt channel access, and receive the DL data from the AP.

Figure 22:
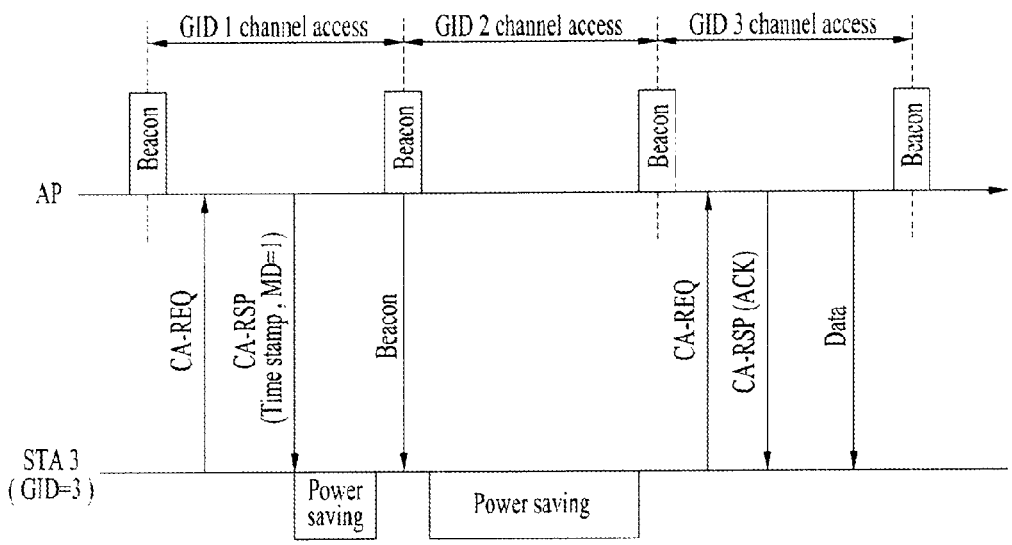

Referring to FIG. 22, after calculating the channel access interval of its group from the time stamp information included in the second frame received from the AP, the STA may further perform channel access (e.g., CA-REQ and CA-RSP transmission and reception) before waking up at the corresponding timing and receiving the DL data from the AP, in addition to the operation illustrated in FIG. 21.

In the additional channel access, the AP may transmit a second frame including ACK information (refer to FIG. 18(*b*)) to the STA in response to the first frame and then transmit data to the STA.

While the ACK information included in the second frame may be configured as an ACK field as illustrated in FIG. 18(*b*), the ACK information may be configured as an MD field of a Frame Control field in the various examples of the second frame (see FIGS. 18, 19, and 20), as in an ACK frame.

If channel access is available to the STA at the time of receiving the first frame from the STA at the AP, the AP may indicate that channel access is accepted by transmitting an ACK frame to the STA, instead of a CA-RSP frame, as illustrated in FIG. 22. In this case, if the AP has buffered DL data to be transmitted to the STA, the AP may set an MD field to 1 in the ACK frame.

Figure 23:
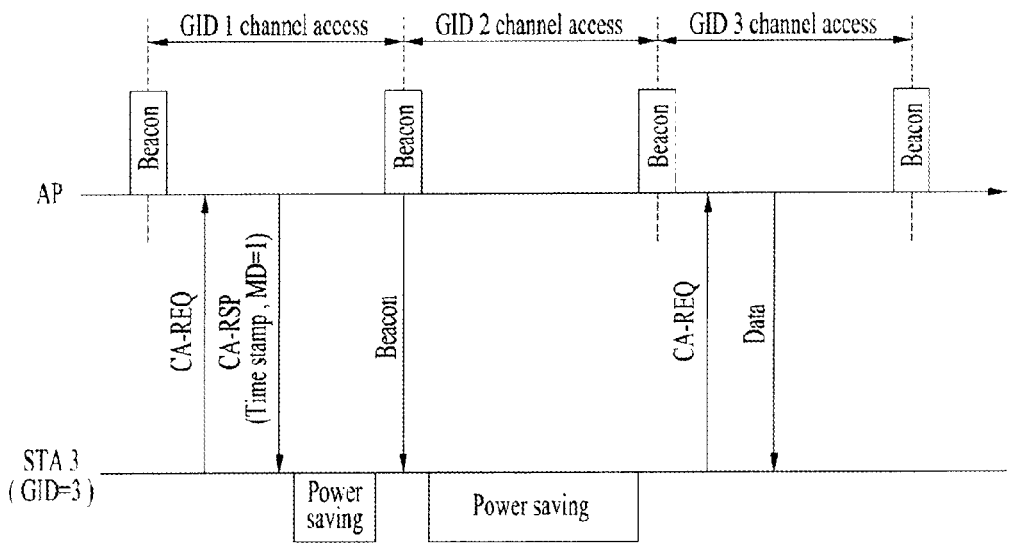

Referring to FIG. 23, upon receipt of the first frame from the STA, the AP may transmit DL data to the STA without transmitting a second frame including an ACK or an ACK frame to the STA. In FIG. 23, the STA and the AP operate in the same manner as in the example of FIG. 22, before a GID 3 channel access interval. When the STA transmits a first frame (e.g., a CA-REQ frame) to the AP in its channel access interval, the AP may transmit DL data immediately to the STA.

Figure 24:
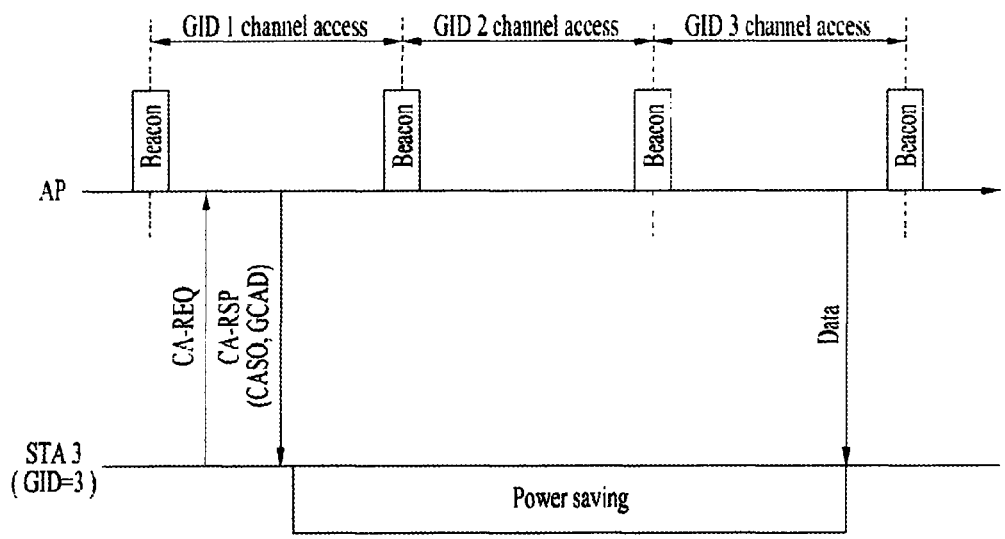

Referring to FIG. 24, upon receipt of a first frame from an STA, an AP may transmit a second frame including CASO and GCAD (refer to FIG. 18(*c*)) to the STA.

The CASO specifies a time at which the AP starts to allow channel access for the STA. That is, the CASO is information indicating a time when an STA for which channel access is currently denied and which returns to the sleep state should wake up later. The CASO may be provided as specific timer information (i.e., the STA may wake up upon expiration of a specific timer). For DL data transmission, the CASO may be set to a time at which the AP will transmit DL data to the STA, whereas in UL data transmission, the CASO may be set to a time at which the STA will transmit UL data to the AP. Or the CASO may indicate a next Target Beacon Transmission Time (TBTT), a starting time of transmitting a beacon frame to a group to which the STA belongs, or a starting time of a group channel access interval for the STA. In DL data transmission, the AP may attempt to transmit DL data after the time indicated by the CASO. The CASO may be set to indicate a starting position of the channel access interval of the group to which the STA belongs (GID 3 channel access interval in FIG. 24) irrespective of DL/UL data transmission.

The GCAD indicates a time period during which the STA may access a channel. A reference time (or starting time) of the time period is indicated by the CASO.

If the STA acquires the CASO information and the GCAD information from the second frame received from the AP, the STA may attempt to receive data at a time point indicated by the CASO even though the STA does not determine its group or the position of the channel access interval for the group. Therefore, upon receipt of the CASO and the GCAD in the second frame, the STA may further save power by maintaining the sleep state until the time point indicated by the CASO.

Referring to FIG. 24, the MD bit is set to 1 in the second frame and thus the STA wakes up at the time point indicated by the CASO and attempts to receive DL data during the time period indicated by the GCAD. While not shown, if the MD bit is set to 1 in the first frame transmitted by the STA, the MD bit is about UL data transmission and the STA may wake up at the time point indicated by the CASO and attempt to transmit UL data during the time period indicated by the GCAD.

Figure 25:
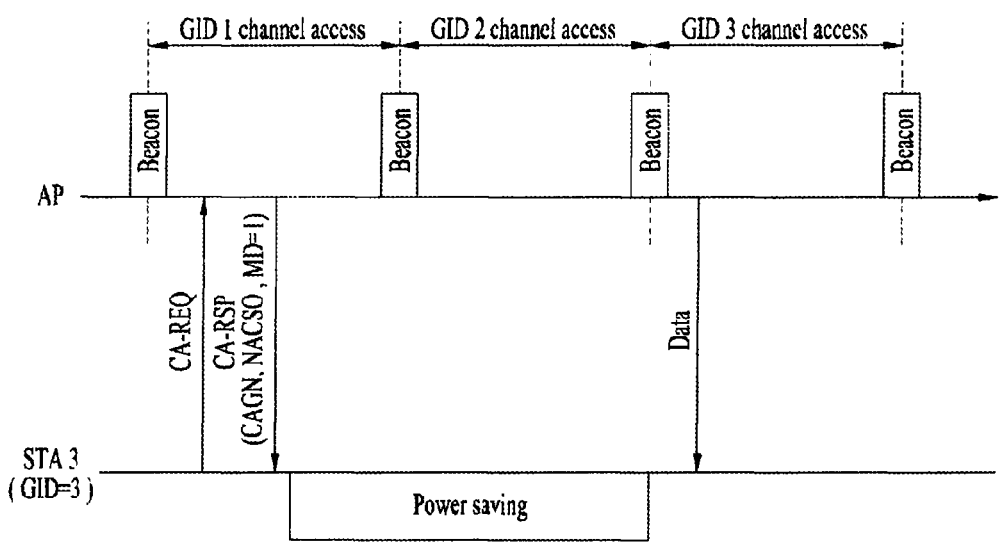

Referring to FIG. 25, upon receipt of a first frame from an STA, an AP may transmit a second frame including CAGN information and NAGSO information (refer to FIG. 18(d)) to the STA.

The STA may determine a group for which channel access is allowed at a current time from the CAGN information. The STA may also determine the starting time of the next channel access interval from the NAGSO information. In the example of FIG. 25, the STA may recognize that a current channel access interval is for group 1 (GID 1) and determine a starting time of a channel access interval for group 2 (i.e. GID 2) being the next group for which channel access is allowed, based on the CAGN information received in the second frame.

If the STA has knowledge of the total number of groups, the channel access intervals of all groups are of the same length, and the groups have the same configuration information, the STA may calculate the position of the channel access interval of its group using the CAGN information and the NAGSO information.

$$\text{StartOffset(GID)} = \text{NAGSO} + (|\text{GID} - \text{CAGN} - 1| \bmod N) * I \quad \text{[Equation 1]}$$

In [Equation 1], GID represents a group number allocated to an STA, which may be given as an Access Group Number of STA (AGNS) for the STA and CAGN represents the number of a group for which access is currently allowed. As described before, NAGSO represents the starting point of the channel access interval of the next access group, in microseconds (p). N represents the total number of groups supported by an AP, I represents the length of the channel access interval of a group, and || represents an absolute value, and mod represents a modulo operation.

In the example of FIG. 25, since the total number of groups is 3, the GID of the STA is 3, and a current group number is 1, the starting time of the channel access interval of the group to which the STA belongs (i.e. group 3) may be calculated to be NAGSO+I (=NAGSO+(3−1−1)mod 3)*I).

[Equation 1] is based on the assumption that a total of 4 groups are given and indexed from 1 to 4. If the groups are indexed from 0 to 3, [Equation 1] may be modified to [Equation 2].

$$\text{StartOffset(GID)} = \text{NAGSO}(|\text{GID} - \text{CAGN}| \bmod N) * I \quad \text{[Equation 2]}$$

If the AP provides the CASO information and the NAGSO information to the STA by the second frame as described before, the STA may wake up at the starting time of the channel access interval of its group and receive data, without the need for waking up and receiving a beacon at the next beacon timing.

To determine the right starting point of the channel access interval of its group from the CASO information and the NAGSO information received in the second frame, the STA should have prior knowledge of the total number of groups, N, the length of a group channel access interval (I), etc. The STA may receive information about N and I from the AP, when an AID (GID or PID) is allocated to the STA during association with the AP.

Referring to FIG. 25, if the STA has not received information about the total number of groups, N managed by the AP and/or information about the length I of the channel access interval of a group from the AP, when the AID (or GID/PID) is allocated to the STA or before the STA operates in the sleep mode, the AP may provide the information (e.g., N and I values) along with the CAGN information and the NAGSO information in the second frame to the STA. Thus, the STA may determine the starting time of the channel access interval of its group.

Figure 26:
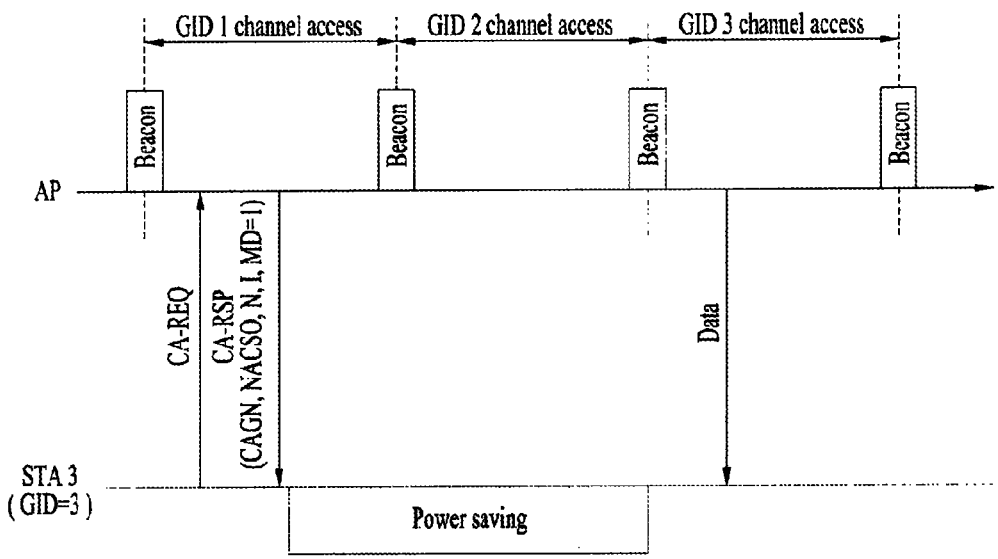

In the case where CASO and GCAD are included in a second frame (e.g., a CA-RSP frame) (see FIG. 18(c)) or CAGN and NGASO are included in a second frame (e.g., a CA-RSP frame) (see FIG. 18(d)), the STA receives DL data from the AP without performing a channel access operation (e.g., first frame transmission) in the channel access interval allocated to its group in the examples of FIGS. 24, 25, and 26. However, this does not limit the scope of the present invention. That is, as described before with reference to FIGS. 21, 22, and 23, in the case where other exemplary formats of the second frame are used, when the STA attempts channel access in its channel access interval, the STA may perform first frame transmission, second frame reception, and data reception (similar to the example of FIG. 22), first frame transmission, ACK frame reception, and data reception (similar to the example of FIG. 22), or first frame transmission and data reception (similar to the example of FIG. 23).

Figure 27:
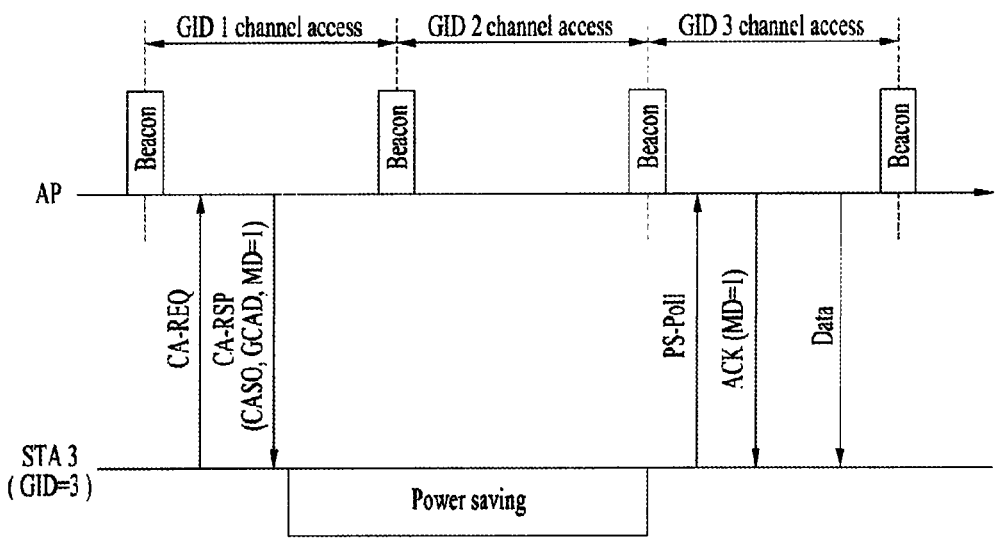

Referring to FIG. 27, when an AP transmits a second frame (e.g., a CA-RSP frame or an ACK frame) in response to a first frame (e.g., a CA-REQ frame or a PS-Poll frame) received from an STA, the AP may set an MD bit to 1 in the second frame in the presence of data to be transmitted to the STA. Or after receiving the first frame (e.g., the PS-Poll frame), the AP may transmit data directly to the STA without transmitting an ACK to the STA.

Figure 28:
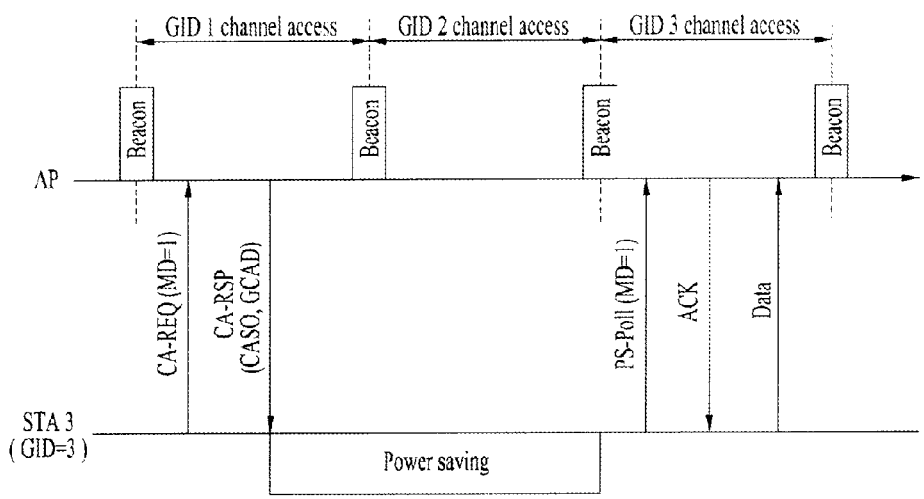

Referring to FIG. 28, when an STA transmits a first frame (e.g., a CA-REQ frame or a PS-Poll frame) to an AP, the STA may set an MD bit to 1 in the first frame in the presence of data to be transmitted to the AP. Or upon receipt of an ACK or data from the AP after transmitting the PS-Poll frame to the AP, the STA may transmit the data to the AP.

In the examples of FIGS. 27 and 28, the STA, which has not received a beacon frame after waking up, transmits a CA-REQ frame as the first frame to the AP and receives a CA-RSP frame as the second frame from the AP. Then the STA uses a PS-Poll frame and an ACK frame as the first and second frames, respectively to access a channel in the channel access interval of the group to which the STA belongs. However, this does not limit the scope of the present invention. Rather, various modification examples are available, such as use of a PS-Poll frame as a first frame used for an STA which has not received a beacon frame after wake-up and use of a CA-REQ frame as a first frame that the STA transmits to an AP in a channel access interval of the STA.

While an STA, which has not received a beacon frame shortly after waking up, transmits a first frame to an AP, for channel access, receives a second frame from the AP in response to the first frame, and acquires information about a channel access interval of a group to which the STA belongs from the second frame in a similar manner to FIG. 25 in the examples of FIGS. 27 and 28, this does not limit the scope of the present invention. That is, first and second frames that a sleep-mode STA exchanges with an AP after the STA transitions to the awake state may be configured in formats illustrated in FIGS. 17 and 18.

Figure 29:
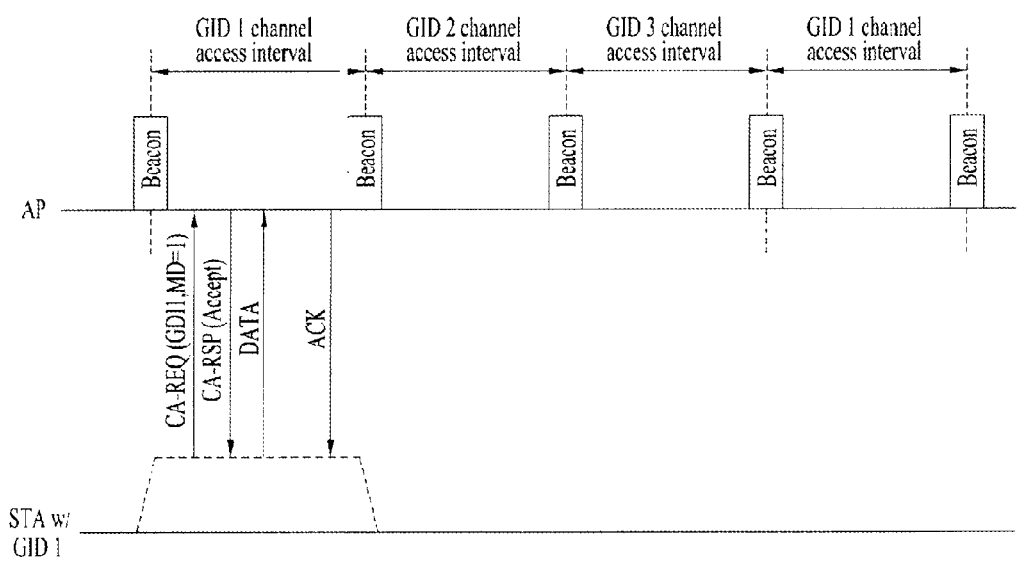

Referring to FIG. 29, if a sleep-state STA switches to the awake state to transmit a UL frame (e.g., a data frame, a control frame, a management frame, etc.), the STA may transmit a first frame to an AP even though it has not received a beacon. In this case, to notify the AP of the presence of UL data to be transmitted, the STA may set an MD bit of a Frame Control field to 1 in the first frame. Alternatively or additionally, the STA may include a UL/DL indicator in the first frame to explicitly indicate whether the transmitted first frame (e.g., CA-REQ frame) is a channel access request for DL reception or UL transmission, as illustrated in FIG. 17(c).

Upon receipt of the first frame from the STA, the AP may extract GID information of the STA from AID information included in the first frame. The AP may determine based on the GID information whether channel access is to be allowed for the STA. For example, the AP may determine whether channel access is allowed for the STA at the time of receiving the first frame. In the example of FIG. 29, since the reception of the first frame from the STA falls into the channel access interval of group 1 (i.e., GID 1) and the GID of the STA that the AP has extracted from the AID information of the first frame is 1, the AP may determine that channel access is allowed for the STA. Accordingly, the AP may include information indicating whether channel access is allowed for the STA in the second frame and transmit the second frame to the STA.

For example, the second frame may be configured in the format illustrated in FIG. 19. That is, fields added to the basic fields (e.g., the Frame Control field, the AID field, the BSSID field, and the FCS field) of the second frame are collectively referred to as an response information field which includes a Response type field and a Body part. For example, the Response type field may be 3 bits long. The Response type field may be set to a value indicating whether channel access is allowed for an STA. For example, the Response type field included in the response information field of the second frame may have values and meanings as illustrated in [Table 1].

TABLE 1

| Values of Response type field | Meaning | Description |
| --- | --- | --- |
| 000 | Accept | Accept channel access from STA |
| 001 | Reject | Reject channel access from STA |

TABLE 1-continued

| Values of Response type field | Meaning | Description |
| --- | --- | --- |
| 010 | GID/AID reassignment | Channel access from STA is accepted and new GID (or AID) is allocated to the STA |
| 100-111 | Reserved | Definable for future use |

As described in [Table 1], when the AP accepts channel access from the STA (e.g., when the GID of a corresponding channel access interval is identical to the GID allocated to the STA), the AP may set the Response type field to 000 in the second frame and transmit the second frame to the STA.

The value 000 of the Response type field may mean an ACK for a request of the STA (a channel access request of the STA by a CA-REQ or PS-Poll frame). Therefore, upon receipt of the second frame with the Response type field set to 000 from the AP, the STA may perform UL channel access in the presence of UL data to be transmitted to the AP (e.g., when the STA transmitted the first frame with an MD bit set to 1 to the AP). In the presence of DL data to receive from the AP (e.g., when the AP transmitted the second frame with an MD bit set to 1 to the STA), the STA may wait and receive the DL data from the AP.

The second frame transmitted by the AP may further include information about a current channel access duration along with the Response type field (see FIG. 20(a)). The STA may perform channel access during a time period set as the current channel access duration and discontinues the channel access, upon expiration of the current channel access duration.

For accurate time synchronization between the STA and the AP, the second frame may include time stamp information (see FIG. 20(b)). The time stamp information may be included only when the Response type field is set to 000 (i.e. indicating accept for channel access). Or the time stamp information may always be included in the second frame to provide accurate time synchronization to the STA irrespective of the values of the Response type field.

On the other hand, the AP may reject the channel access request of the STA. For example, if the GID of the current channel access interval is different from the GID of the STA or too many STAs attempt channel access currently, the AP may reject the channel access request of the STA. In this case, the AP may transmit a second frame with a Response type field set to 001 to the STA.

The Body part of the second frame may include a CCA-GID field and a NAGSO field (see FIG. 20(c)). The CCA-GID information corresponds to the afore-described CAGN information. This example may be more appropriate for the case of a Response type field set to 001 (i.e. reject for channel access). For example, an STA for which channel access is rejected may calculate the starting location (or starting offset) of the channel access interval of a group to which the STA belongs from CCAGID information and NAGSO information included in a second frame by [Equation 1] or [Equation 2]. Therefore, the STA may attempt channel access at the starting time of the channel access interval of its group.

The Body part of the second frame may include a CASO field and a GCAD field (not shown) instead of a CCAGID and a NAGSO. This second frame may be more useful for the case where the Response type field is set to 001 (i.e. reject channel access). If an STA acquires CASO information and GCAD information from a second frame received from an AP, the STA may attempt to receive data during a time period indicated by the GCAD from a time indicated by the CASO.

The Body part of the second frame may include a time stamp field and a GCAD field in addition to the CCAGID and the NAGSO (see FIG. 20(d)). This second frame may be more appropriate for the case where the Response type field is set to 001 (i.e. reject for channel access).

It may be defined in the additional exemplary formats of the second frame described before with reference to FIGS. 19 and 20 that at least one of a time stamp, a CCAGID, a NAGSO, a CASO, and a GCAD is always included in the second frame irrespective of the value of a Response type field (i.e. irrespective of whether channel access is accepted or rejected). Accordingly, an STA may more accurately calculate the channel access interval of a group to which the STA belongs.

The AP may also allow data transmission for an STA by changing a group to which the STA belongs. In this case, the Response type field may be set to 010 and the Body part may include a new GID (or a new AID) in the second frame. For example, although GID X of an STA requesting channel access (or transmitting a first frame) is different from GID Y of a current channel access interval, the AP may determine that it is preferred to accept channel access of the STA in consideration of a current network situation (e.g., when the density of accessing STAs of a current group is low or the STA requesting channel access is placed in an emergency state). In this case, the AP may reallocate Y as a new GID to the STA so that the STA may perform channel access in the current channel access interval. If a GID is derived from information included in an AID field rather than the GID is set separately, the AP may allocate a new GID to the STA by transmitting a second frame including the new AID to the STA.

Upon receipt of the second frame with the Response type field set to 001 (i.e., when channel access is rejected for an STA in a current channel access interval), the STA may calculate a time at which and a time period during which channel access is accepted for the STA using information included in the second frame, stays in the sleep state until the time, switch to the awake state at the time, and attempt channel access.

In the case of DL channel access, the STA may await reception of DL data from the AP from the time determined by the calculation. Or for DL channel access, the STA may request channel access to the AP (e.g., by transmitting the first frame (CA-REQ or PS-Poll frame) to the AP) at the determined time. The AP may transmit DL data after transmitting a second frame (e.g., CA-RSP or ACK frame) to the STA in response to the first frame, or may transmit DL data immediately to the STA without transmitting the second frame.

In UL channel access, the STA may request a UL channel access (e.g., by transmitting a first frame (e.g., CA-REQ or PS-Poll frame) to the AP at the time determined by the calculation and then transmit UL data, or the STA may transmit UL data without transmitting a first frame to the AP. Upon receipt of the CA-REQ frame from the STA, the AP may transmit a CA-RSP frame or an ACK frame to the STA. Or upon receipt of an RTS frame from the STA, the AP may transmit a CTS frame to the STA. Or upon receipt of data without receiving a first frame or an RTS frame, the AP may transmit an ACK frame to the STA.

With reference to FIGS. 30 to 34, a method for using a PS-Poll frame as a first frame will be described. An STA transmits a PS-Poll frame to an AP to perform a channel access procedure (i.e. to determine whether the AP has data to be transmitted to the STA). In the presence of transmission data directed to the STA, the AP may transmit the data immediately to the STA or may transmit an ACK frame with MD=1 and then the data to the STA. In the absence of transmission data directed to the STA, the AP may transmit an ACK frame with MD=0 to the STA.

As described before with reference to FIG. 10 or 11, an STA which has received a TIM included in a beacon frame may use a conventional PS-Poll frame to indicate to an AP that the STA is awake and ready to receive DL data. While a PS-Poll frame of the present invention (i.e., a PS-Poll frame as an exemplary first frame) may be configured basically in the same format as the conventional PS-Poll frame, even an STA that has not received a beacon frame (i.e. a TIM) may transmit the PS-Poll frame of the present invention.

Figure 30:
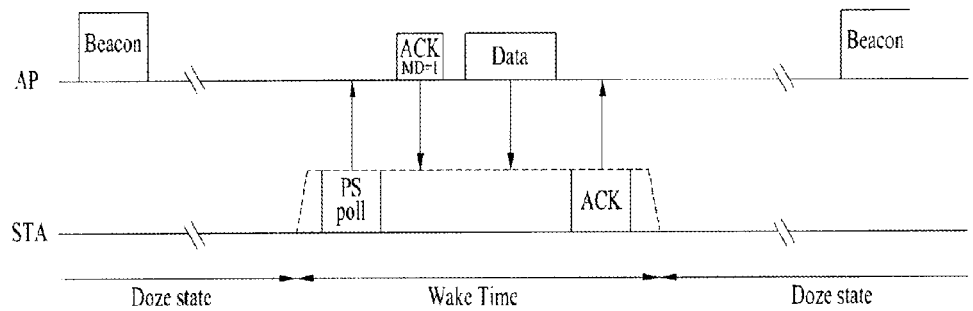

Referring to FIG. 30, an STA may switch from the sleep state (or doze state) to the awake state and transmit a first frame (e.g., a PS-Poll frame) to an AP to determine whether the AP has DL data to be transmitted to the STA. The AP may transmit a second frame (e.g., an ACK frame) indicating the presence of transmission data for the STA (i.e. MD=1) to the STA in response to the first frame. Subsequently, the AP may transmit the DL data to the STA and the STA may reply to the AP with an ACK frame.

In an example of the present invention, when the AP transmits a second frame (i.e., an ACK frame or a Response frame in response to a channel access request (or a PS-Poll frame) received from the STA) to the STA, the AP may include explicit or implicit information (e.g., time synchronization information) indicating the channel access interval of the group to which the STA belongs. For example, if the STA operates in the long sleep mode, the STA may have a high probability of time asynchronization with the AP when the STA wakes up and transmits a first frame to the AP. Thus, the AP may include time stamp information in the second frame. That is, an operation for transmitting time stamp information to the STA by the AP even though the STA does not request a time stamp to the AP may be defined according to the present invention.

The time synchronization information (e.g., time stamp information) may be included in the second frame (e.g., CA-RSP frame, ACK frame, etc.). If the AP transmits data without receiving an ACK from the STA, the time synchronization information may be piggybacked to a data frame.

Figure 31:
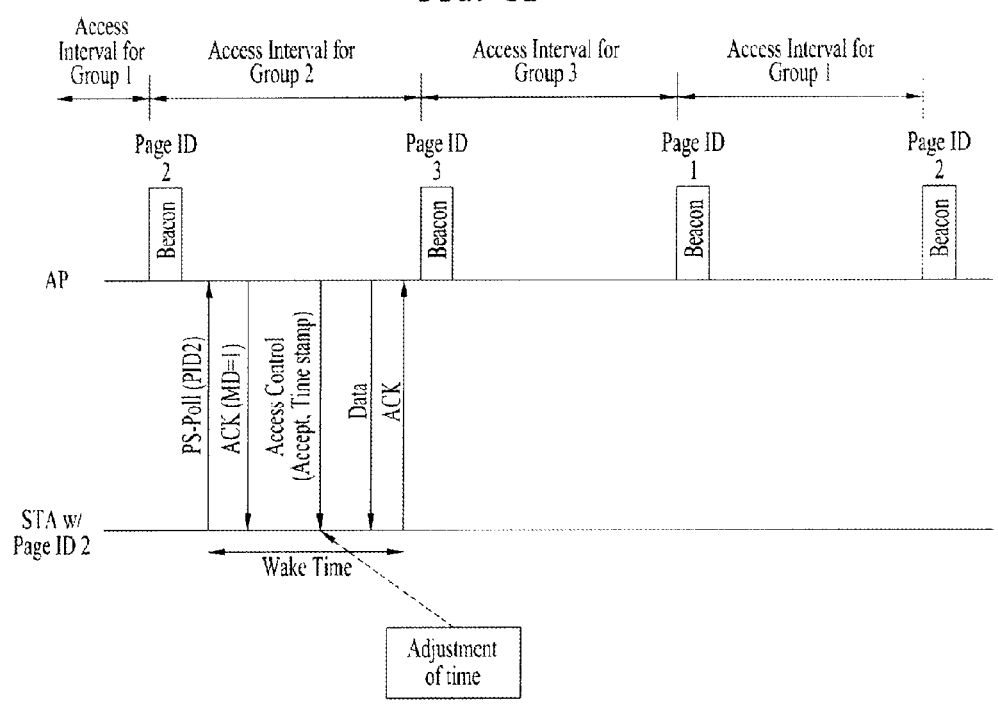

Referring to FIG. 31, an STA with Page ID 2 (PID2) may transmit a first frame (e.g., a PS-Poll frame) to an AP. The AP may transmit an ACK frame including an MD bit set to 1 to the STA in response to the PS-Poll frame, indicating the presence of data to be transmitted to the STA. While the AP is preparing the data to be transmitted to the STA, the AP may transmit time synchronization information (e.g., time stamp information) to the STA. A second frame (e.g., a CA-RSP frame configured in the format illustrated in FIG. 18(a)) may deliver the time stamp information. Or the time stamp information may be transmitted standalone in a separate frame (e.g., an Access Control frame) as illustrated in FIG. 31. The Access Control frame may include information indicating whether a channel access request of the STA is accepted or rejected. In FIG. 31, since the PID of the STA is identical to the PID of a current channel access interval, the channel access of the STA is accepted. Therefore, the Access Control frame may include information indicating accept for channel access and time stamp information. Upon receipt of the time stamp information, the STA may adjust its timing based on the time stamp information. Then the AP may transmit the data to the STA and the STA may transmit an ACK to the AP in response to the received data and return to the sleep state. Or the second frame (e.g., the Access Control frame) may be concatenated to a data frame so that the second frame and the data frame may be transmitted together at one time.

The AP may determine implicitly whether an STA operates in the long sleep mode from the AID of the STA. Thus, the AP may determine whether to provide time synchronization information (e.g., time stamp information) to the STA. When the STA transmits a first frame (e.g., a CA-REQ frame or a PS-Poll frame) to the AP, the STA may include information explicitly indicating whether the STA operates in the long sleep mode in the first frame. If the AP determines from the received information that the STA operates in the long sleep mode, the AP may provide the time synchronization information (e.g., the time stamp information) to the STA.

While time stamp information is taken as an example of time synchronization information for an STA in the above examples, the present invention is not limited to the specific time synchronization information. That is, various types of information described with reference to FIGS. 18, 19, and 20 may be provided to the STA along with explicit/implicit information with which the STA may adjust its time synchronization. For example, time offset information (e.g., CASO information) for wake-up of the STA may be transmitted in a second frame (e.g., a CA-RSP frame, an ACK frame, etc.) to the STA.

Figure 32:
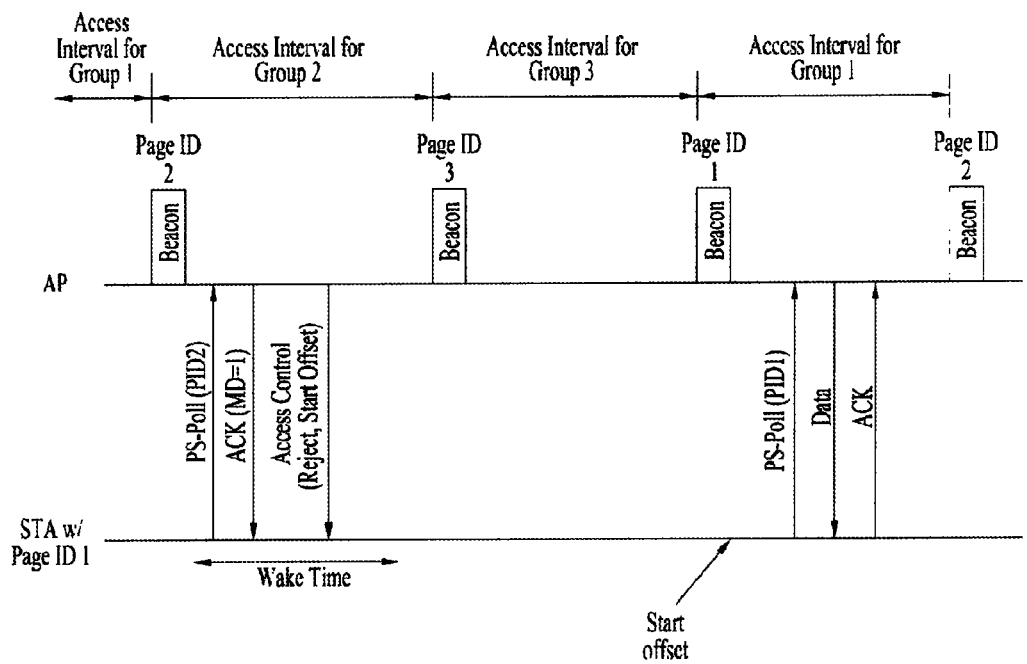

Referring to FIG. 32, if an STA with PID1 transmits a first frame (e.g., a PS-Poll frame) and an AP has data to be transmitted to the STA, the AP may transmit an ACK frame with an MD bit set to 1 to the STA in response to the PS-Poll frame. However, since a current channel access interval is for an STA with PID2, the AP may not accept channel access of the STA with PID1. Hence, the AP may transmit to the STA a second frame (e.g., an Access Control frame) including information indicating that the channel access is rejected. The AP may further include information about a stating offset (or a starting point) in the Access Control frame so that the STA may operate in the sleep state until a channel access interval allocated to the PID of the STA. Accordingly, the STA may wake up at a time point indicated by the starting offset, perform a channel access operation (e.g., transmission of a first frame (e.g., a PS-Poll frame), etc.), and receive DL data directed to the STA successfully.

Figure 33:
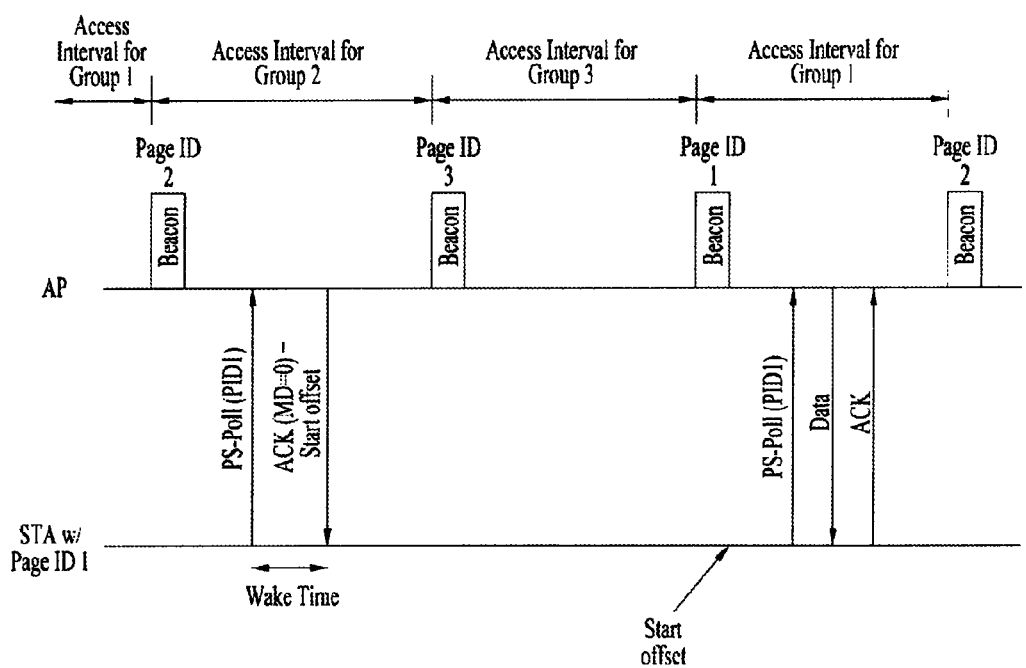

Referring to FIG. 33, an STA with PID1 transmits a first frame (e.g., a PS-Poll frame) and an AP has data to be transmitted to the STA as in the example of FIG. 32. To simplify the channel access request/response procedure, the AP may transmit a second frame (e.g., an ACK frame) with an MD bit set to 0 to the STA despite the presence of data to be transmitted to the STA, if the PID of the STA is different from the PID of a current channel access interval. Additionally, the AP may transmit information indicating the starting point of a channel access interval configured for the PID of the STA (i.e. a starting offset) along with the ACK frame to the STA. For this purpose, various exemplary formats of the second frame (e.g., CA-RSP, ACK, or Access Control frame) are available.

In the above examples, upon receipt of information indicating time points at which channel access is allowed, STAs may wake up at the time points from the sleep state and attempt channel access. The STAs which are awake may transmit a first frame (e.g., a CA-REQ frame or a PS-Poll frame) or may await reception of DL data without transmitting a first frame.

Figure 34:
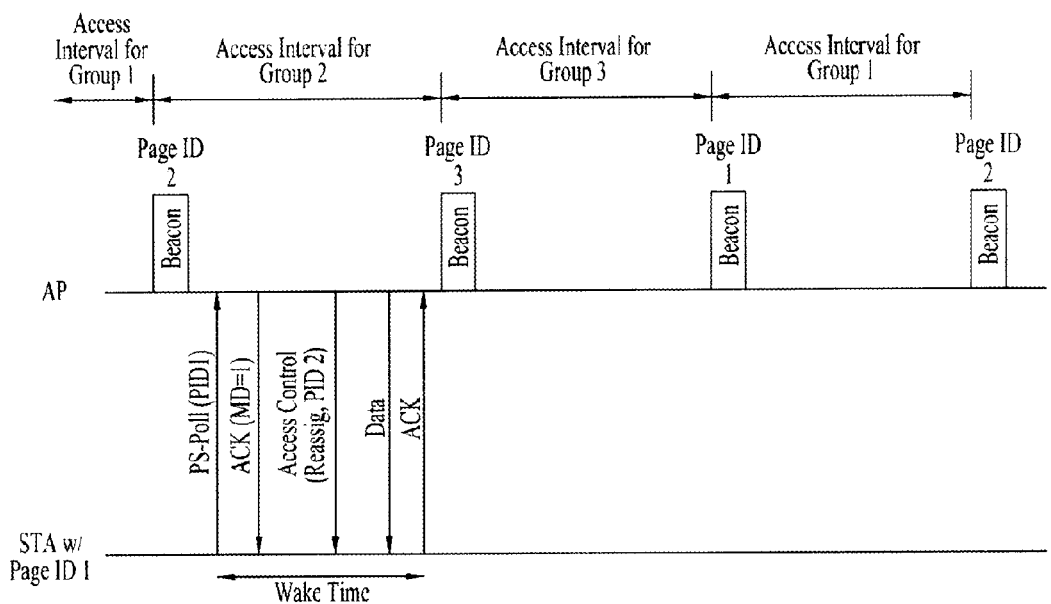

Referring to FIG. 34, an STA with PID1 transmits a first frame (e.g., a PS-Poll frame) to an AP and the AP has data to be transmitted to the STA as in the example of FIG. 32 or 33. In the illustrated case of FIG. 34, operations of an STA and an AP may further be simplified by reallocating an AID (or PID/GID) to an STA for which a current channel access interval is not available and thus accepting channel access of the STA in the current channel access interval. In the example of FIG. 34, upon receipt of the first frame from the STA with PID1, the AP may transmit to the STA information that reallocates PID2 of the current channel access interval as a new PID to the STA. The information may be configured in an exemplary format of the second frame (e.g., illustrated in FIG. 20(e)) or may be transmitted in a new standalone frame (e.g., an Access Control frame). In this case, the Response type field of the second frame may be set to a value indicating AID (or PID/GID) reassignment, other than accept or reject. Thus, the STA may reset its AID (or PID/GID) to the new value, perform channel access to the AP, and receive DL data from the AP successfully.

Even when the AP reallocates an AID (or PID/GID) to the STA, the AP may additionally transmit time synchronization information (e.g., time stamp information, time offset information for wake-up (e.g., CASO information), channel access duration information, etc.) to the STA. That is, as stated before, the AP may include the time synchronization information for the STA in the second frame (at any time) irrespective of channel access accept/reject/ID reassignment for the STA requesting channel access (transmitting the first frame). The time synchronization information may include time stamp information, neat beacon transmission timing information, time offset information for wake-up (e.g., CASO information), information about a duration during which the STA may use a channel (e.g., GCAD information), etc.

Figure 35:
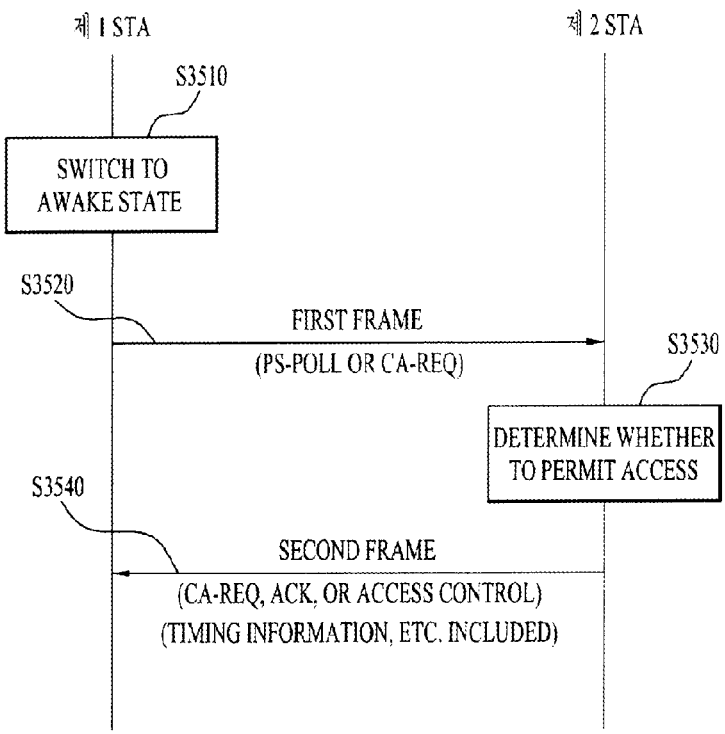
FIG. 35 is a diagram illustrating a signal flow for a channel access method according to an example of the present invention.

FIG. 35 is a diagram illustrating a signal flow for a channel access method according to an example of the present invention.

Referring to FIG. 35, a first STA (e.g., a non-AP STA) may switch from the sleep state to the awake state in step S3510.

In step S3520, the first STA may transmit a first frame proposed by the present invention (e.g., a PS-Poll frame or a CA-REQ frame) to a second STA (e.g., an AP). For example, after wake-up, the first STA may transmit the first frame at any time (e.g., even when the STA fails to receive a TIM in a beacon frame).

In step S3530, the second STA may determine whether to accept or reject channel access from the first STA in comprehensive consideration of information included in the first frame received from the first STA, the group number of a current channel access interval, a network situation, etc.

The second STA may transmit a second frame proposed by the present invention (e.g., an ACK frame, a CA-RSP frame, or an Access Control frame) to the first STA in response to the received first frame in step S3540. The second frame may include timing information such as time synchronization information for the first STA or information about a time point at which the first STA is supposed to wake up from the sleep state at the next time. Further, information described in relation to the foregoing various examples of the present invention may be included in the second frame.

Therefore, the first STA may perform channel access with minimal power consumption, even though time is asynchronous between the first STA and the second STA.

Now a description will be given of a method for performing channel access in relation to UL data transmission of an STA with reference to examples illustrated in FIGS. 36 to 43.

In UL data transmission according to the present invention, an STA may include information indicating the presence or absence of UL data in a first frame related to a channel access request and may transmit the first frame. In other words, the UE may include information corresponding to a UL channel use request in the first frame to determine whether UL data for the STA exists or UL data transmission is available. The first frame may be a PS-Poll frame, a Null Data Packet (NDP) PS-Poll frame, or a newly defined CA-REQ frame as described before. More specifically, the STA may switch from the doze state to the awake state at a specific time (e.g., in a listening interval) without receiving a beacon frame in the doze state and may transmit an NDP PS-Poll frame (or PS-Poll frame). The NDP PS-Poll frame (or PS-Poll frame) may include information indicating the presence or absence of UL data in the STA. As described later, the information indicating the presence or absence of UL data in the STA may be set in an MD field (set to 1) of the PS-Poll frame. Or the information indicating the presence or absence of UL data in the STA may be transmitted as a UL access request indicator or a DL/UL indicator in the PS-Poll frame or may be transmitted in an SIG field or an FC field of a MAC header in the PS-Poll frame.

As described above, upon receipt of the first frame, the AP may transmit a second frame including information indicating whether UL data transmission is allowed for the STA in response to the first frame. More specifically, the second frame may be an ACK frame, a CA-RSP frame, or DL data. If the information indicating the presence or absence of UL data indicates the presence of UL data in the first frame, the second frame may include information indicating whether the UL access request of the STA is accepted. Examples of UL data transmission of an STA will be described below with reference to FIGS. 36 to 43. In the drawings referred to in the following description, PS-Poll (UL access request=1/MD=1) means the afore-described information/field indicating the presence or absence of UL data, not limited to a UL access request field or an MD field. As far as it indicates the presence or absence of UL data, any other field name may be used. An STA transmits a first frame after receiving a beacon frame and staying much time in the doze state in the drawings referred to in the following description, which should not be construed as limiting the present invention. As described before, the transmission of the first frame may include both PS-Poll frame transmission (or NDP PS-Poll frame transmission) after beacon frame reception and PS-Poll frame transmission (or NDP PS-Poll frame transmission) without beacon frame reception.

FIG. 36 illustrates UL data transmission of an STA, when the STA has UL data to be transmitted to an AP and the AP allows UL data transmission for the STA.

Referring to FIG. 36, an STA may switch from the doze state to the awake state and then transmit a PS-Poll frame including information/a field indicating the presence or absence of UL data to an AP (S3601). The information/field indicating the presence or absence of UL data indicates the presence of UL data (UL access request=1/MD=1). Upon receipt of the PS-Poll frame, the AP may transmit an ACK frame including information/a field indicating permission of UL data transmission (UL access permission=accept(1)) to the STA (S3602). The STA may transmit the UL data to the AP a predetermined time (e.g., a Short InterFrame Space (SIFS)) after receiving the ACK frame (S3603). Upon receipt of the UL data, the AP may transmit a related ACK frame to the STA (S3604).

FIG. 37 illustrates a case where an AP does not permit UL data transmission.

Referring to FIG. 37, an STA may switch from the doze state to the awake state and then transmit a PS-Poll frame including information/a field indicating the presence or absence of UL data to an AP (S3701). Upon receipt of the PS-Poll frame, the AP may determine not to allow UL data transmission and transmit an ACK fame indicating information/a field indicating rejection of UL data transmission (UL access permission=reject(0)) to the STA (S3702). The STA may receive the ACK frame and switch to the doze state, determining that the UL data transmission is not permitted.

In the example of FIG. 37, there is a need for defining when an STA having UL data is supposed to transmit the UL data. Related various methods will be described with reference to FIGS. 38 to 43.

Figure 38:
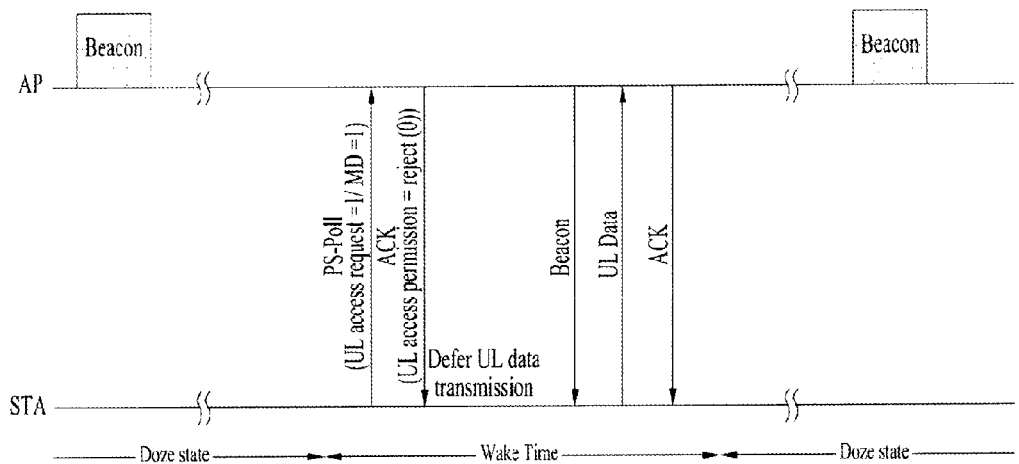

FIG. 38 illustrates exemplary UL data transmission of an STA, when an AP does not permit UL data transmission.

Referring to FIG. 38, upon receipt of an ACK frame indicating that UL data transmission from an STA to an AP is not permitted from the AP in response to a transmitted PS-Poll frame including information/a field indicating the presence of UL data, the STA may transmit the UL data after waiting until receiving a next beacon frame. Therefore, the STA may need to be kept in the awake state until receiving the next beacon frame (more accurately, until receiving an ACK frame after receiving a beacon frame and then transmitting the UL data) after transmission of the PS-Poll frame.

Figure 39:
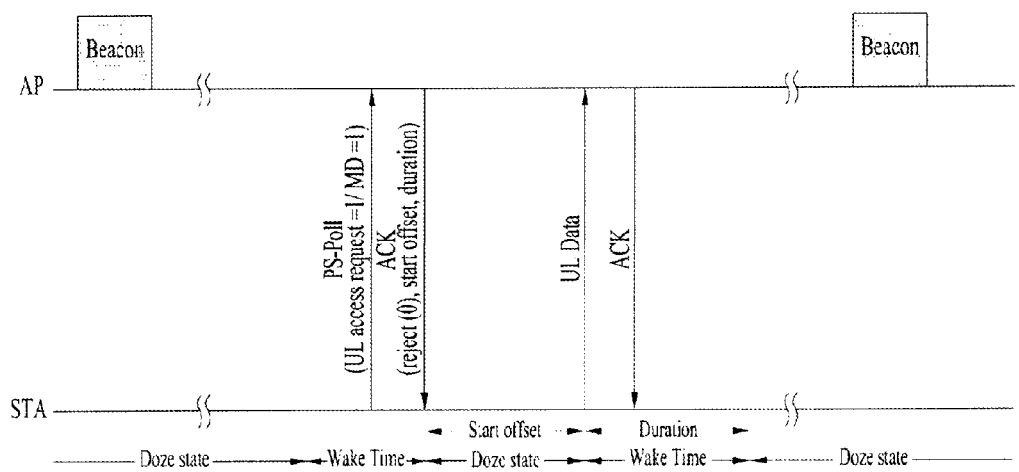

FIG. 39 illustrates a method for transmitting UL data from an STA with reduced power consumption compared to the example of FIG. 38, when an AP does not permit UL data transmission.

Referring to FIG. 39, if an AP receives a PS-Poll frame including information/a field indicating the presence of UL data and determines not to permit transmission of the UL data, the AP may transmit an ACK frame including starting offset information and duration information to an STA. The starting offset information may indicate when the STA is supposed to transmit the UL data. Therefore, the STA may be kept in the doze state until a time indicated by the starting offset, thus saving power. The duration information may indicate a time period during which the STA is to be kept in the awake state. If the STA wakes up at the time indicated by the starting offset and transmits the UL data, the STA may receive an ACK frame during the time period indicated by the duration information, as illustrated in FIG. 39.

Figure 40:
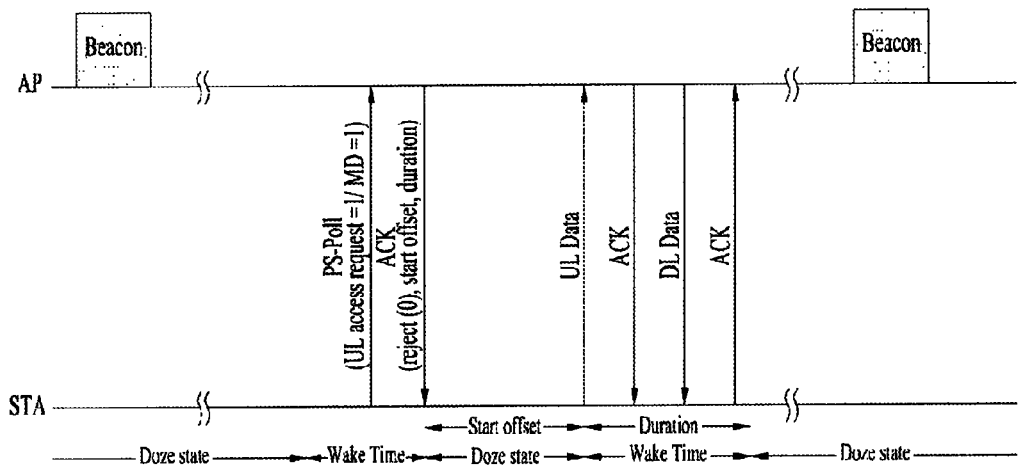

FIG. 40 illustrates a case where the AP has DL data to be transmitted to the STA in the situation of FIG. 39. Referring to FIG. 40, the AP may receive UL data during the time period indicated by the duration information, transmit an ACK frame in response to the received UL data, and transmit buffered DL data.

Figure 41:
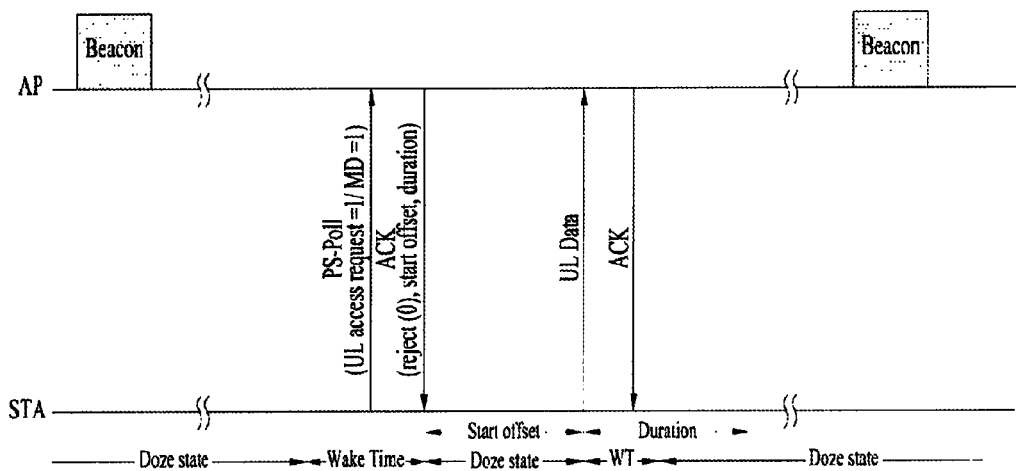

Compared to the example of FIG. 39 in which the STA is kept in the awake state during a time period indicated by duration information, the STA switches to the doze state after transmitting UL data in the example of FIG. 41. That is, the STA switches to the doze state without waiting until expiration of the time period indicated by the duration information in order to save power. In this case, despite the presence of DL data to be transmitted to the STA, the AP may buffer the DL data until the STA transmits another PS-Poll frame.

Figure 42:
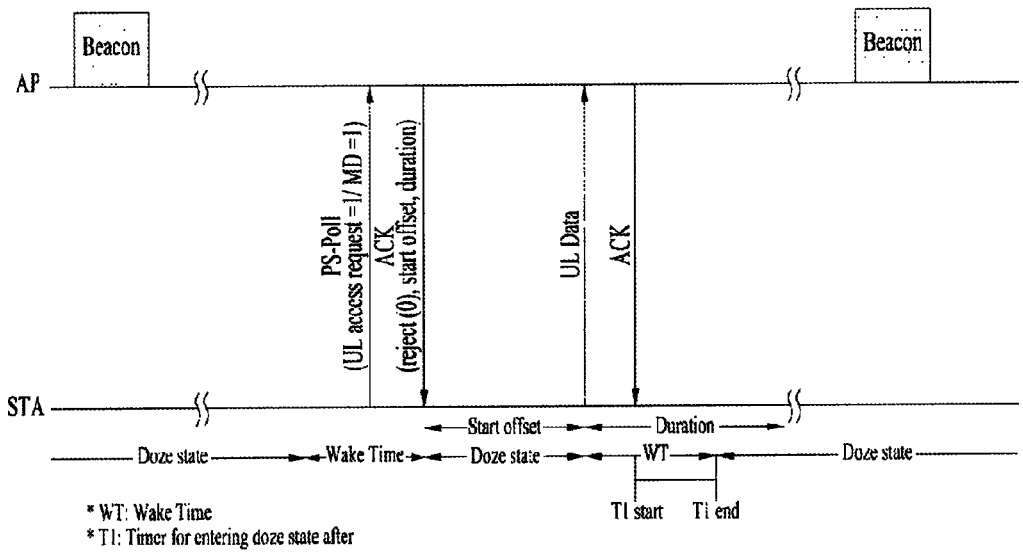

FIG. 42 illustrates an exemplary case in which the STA activates a timer in the situation of FIG. 39. Referring to FIG. 42, the STA transmits UL data after a predetermined time indicated by starting offset information. Upon receipt of an ACK frame in response to the UL data, the STA may activate a T1 timer. If there is no UL data transmission (or no DL data transmission from the AP) until the T1 timer expires, the STA may switch to the doze state even before the expiration of a time period indicated by duration information, to thereby reduce power consumption.

Figure 43:
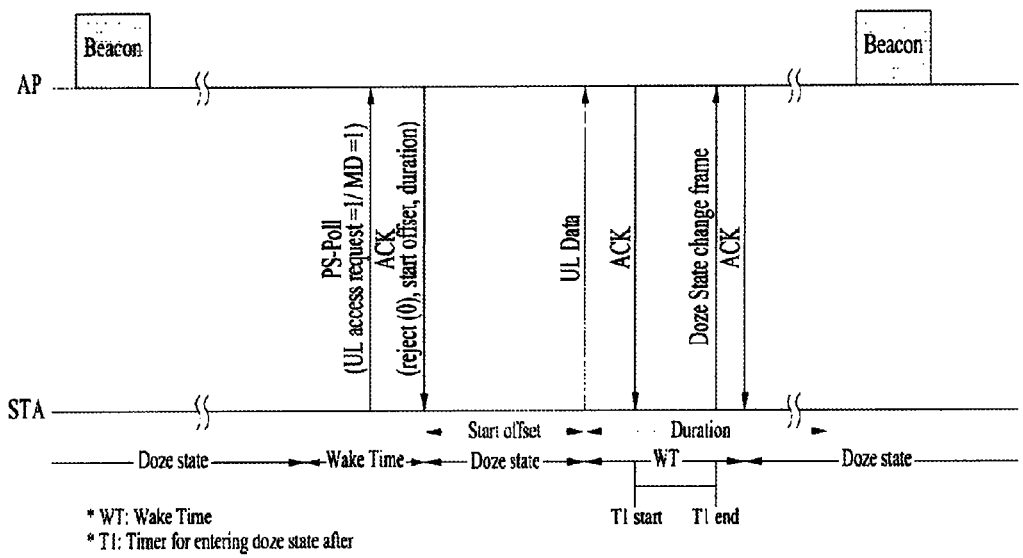

FIG. 43 illustrates an exemplary case in which when the STA switches to the doze state upon expiration of the T1 timer in the situation of FIG. 42, the STA transmits a frame indicating the switching to the doze state to the AP. The STA may transmit the frame indicating switching to the doze state to the AP and then switch to the doze state, without activating the T1 timer in the time period indicated by the duration information.

Figure 44:
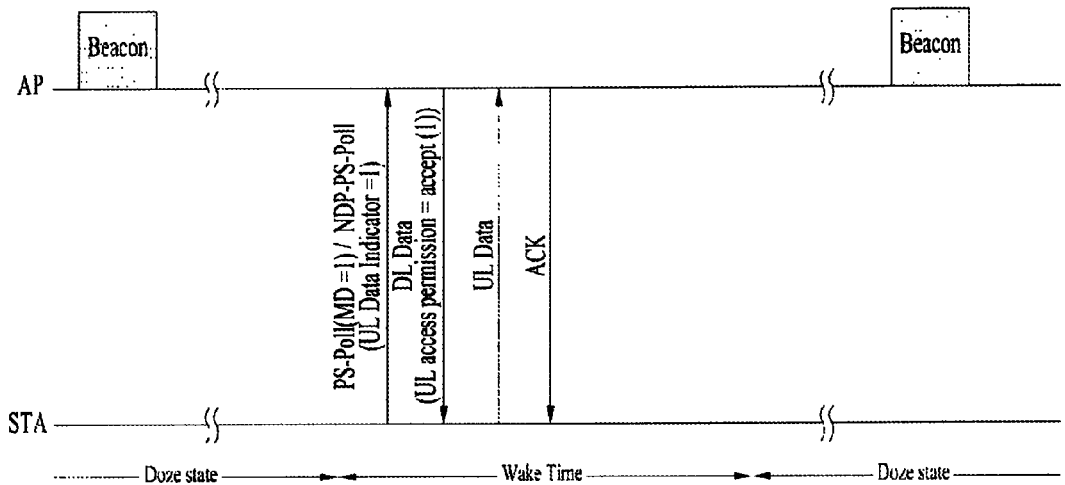

FIG. 44 illustrates an example in which upon receipt of a PS-Poll frame with MD=1 or an NDP PS-Poll frame with UDI=1, an AP transmits DL data immediately to an STA, in the presence of the DL data to be transmitted to the STA.

That is, if the AP receives a PS-Poll frame (or an NDP PS-Poll frame) indicating the presence of UL data from the STA and has DL data to be transmitted to the STA, the AP may allow the STA to use a UL by immediately transmitting the DL data to the STA in response to the PS-Poll frame (or the NDP PS-Poll frame). The AP may include UL access permission information in the DL data. Upon receipt of the DL data with respect to the PS-Poll, the STA may transmit the UL data immediately in response to the DL data. Upon receipt of the UL data in response to the DL data transmission, the AP transmits an ACK (or NDP ACK) frame to the STA in the absence of DL data to be transmitted to the STA. Upon receipt of the ACK frame, the STA may switch to the doze state in the absence of UL data to be transmitted.

The foregoing various embodiments of the present invention may be implemented individually or in combination of two or more.

Figure 45:
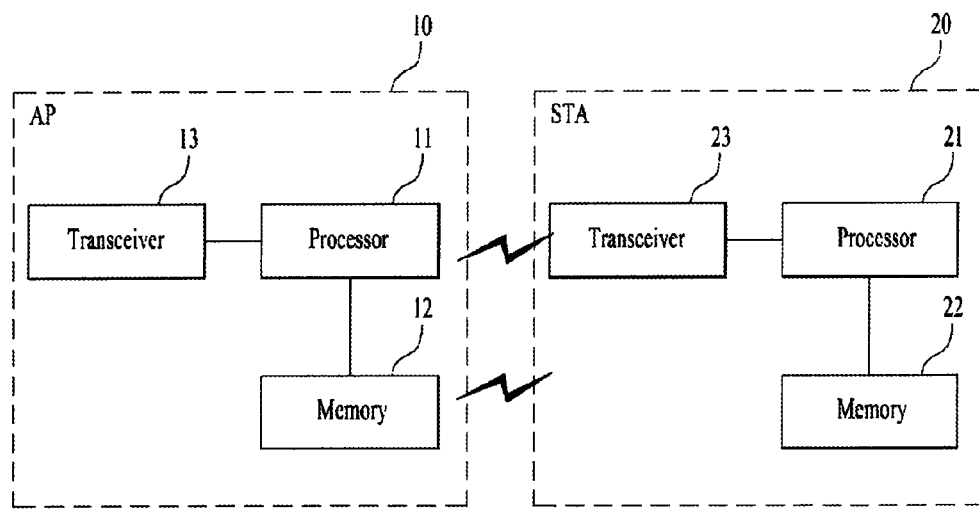
FIG. 45 is a block diagram of wireless apparatuses according to an embodiment of the present invention.

FIG. 45 is a block diagram of wireless apparatuses according to an embodiment of the present invention.

Referring to FIG. 45, an AP 10 may include a processor 11, a memory 12, and a transceiver 13. An STA 20 may include a processor 21, a memory 22, and a transceiver 23. The transceivers 13 and 23 may transmit/receive radio signals and may implement, for example, a physical layer of an IEEE 802 system. The processors 11 and 21 are connected to the transceivers 13 and 21, respectively, and may implement the physical layer and/or a MAC layer of the IEEE 802 system. The processors 11 and 21 may be configured to perform operations according to the above-described various embodiments of the present invention. Modules for implementing operations of the AP and STA according to the above-described various embodiments of the present invention may be stored in the memories 12 and 22 and executed by the processors 11 and 21. The memories 12 and 22 may be installed inside or outside the processors 11 and 21 and connected to the processors 11 and 21 by a known means.

The AP and STA may be configured so that the above-described various embodiments of the present invention are implemented independently or in combination of two or more. A redundant description is omitted for clarity.

The embodiments of the present invention may be implemented by various means, for example, in hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

While the various embodiments of the present invention have been described in the context of an IEEE 802.11 system, they are applicable in the same manner to many other mobile communication systems.

The invention claimed is:

1. A method for performing channel access by a Station (STA) in a wireless communication system, the method comprising:
   transmitting a Power Save (PS)-Poll frame to an Access Point (AP); and
   receiving an ACK frame from the AP in response to the PS-Poll frame,
   wherein when first information included in the ACK frame indicates a first case related with an idle time period, the ACK frame further includes second information indicating the idle time period during which no frame transmission is expected from the STA, and
   wherein when the first information included in the ACK frame indicates a second case related with an identification issue regarding transmission of uplink data, the ACK frame further includes third information regarding additional identification information.

2. The method of claim 1, wherein the ACK frame alternatively includes the second information or the third information based on whether the first information indicates the first case or the second case.

3. The method of claim 1, wherein the PS-Poll frame includes information indicating a presence of uplink data in the STA.

4. The method of claim 1, wherein the ACK frame further includes fourth information indicating a presence of downlink data in the AP.

5. A station (STA) for performing channel access in a wireless communication system, the STA comprising:
   a transceiver that transmits a Power Save (PS)-Poll frame to an Access Point (AP), and receives an ACK frame from the AP in response to the PS-Poll frame; and
   a processor that processes the PS-Poll frame and the ACK frame, wherein when first information included in the ACK frame indicates a first case related with an idle time period, the processor processes the ACK frame as the ACK frame further includes second information indicating the idle time period during which no frame transmission is expected from the STA, and wherein when the first information included in the ACK frame indicates a second case related with an identification issue regarding transmission of uplink data, the processor processes the ACK frame as the ACK frame further includes third information regarding additional identification information.

6. The STA of claim 5, wherein the processor processes the ACK frame as the ACK frame alternatively includes the second information or the third information based on whether the first information indicates the first case or the second case.

7. The STA of claim 6, wherein the processor generates PS-Poll frame to include information indicating a presence of uplink data in the STA.

8. The STA of claim 6, wherein the processor processes the ACK frame as the ACK frame further includes fourth information indicating a presence of downlink data in the AP.

* * * * *